(12) United States Patent
Sakurai et al.

(10) Patent No.: US 7,966,470 B2
(45) Date of Patent: Jun. 21, 2011

(54) APPARATUS AND METHOD FOR MANAGING LOGICAL VOLUME IN DISTRIBUTED STORAGE SYSTEMS

(75) Inventors: Hideki Sakurai, Kawasaki (JP); Yasuo Noguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 332 days.

(21) Appl. No.: 12/390,135

(22) Filed: Feb. 20, 2009

(65) Prior Publication Data

US 2009/0216986 A1    Aug. 27, 2009

(30) Foreign Application Priority Data

Feb. 25, 2008  (JP) ................. 2008-043134

(51) Int. Cl.
*G06F 13/00* (2006.01)
(52) U.S. Cl. .................... 711/170; 711/114; 711/165
(58) Field of Classification Search .................. 711/114, 711/165, 170
See application file for complete search history.

(56) References Cited

U.S. PATENT DOCUMENTS

| 6,957,303 B2* | 10/2005 | Fujimoto et al. ............. 711/114 |
| 7,216,263 B2* | 5/2007 | Takaoka et al. ............. 714/47.2 |
| 2002/0073297 A1 | 6/2002 | Mizuno et al. |
| 2003/0009619 A1 | 1/2003 | Kano et al. |
| 2004/0039875 A1 | 2/2004 | Kuwata |
| 2004/0103244 A1* | 5/2004 | Fujimoto et al. ............. 711/113 |
| 2007/0233987 A1 | 10/2007 | Maruyama et al. |

FOREIGN PATENT DOCUMENTS

| JP | 2002-236560 | 8/2002 |
| JP | A 2002-236560 | 8/2002 |
| JP | 2003-15915 | 1/2003 |
| JP | A 2004-78398 | 3/2004 |
| JP | 2007-279845 | 10/2007 |

* cited by examiner

*Primary Examiner* — Reba I Elmore
(74) *Attorney, Agent, or Firm* — Greer, Burns & Crain, Ltd.

(57) ABSTRACT

A logical volume management apparatus includes a first storage unit that stores configuration information on a first stage logical volume, and a second storage unit that stores configuration information on a second stage logical volume. An access unit finds a storage area in the second stage logical volume that corresponds to the first stage logical volume, and accesses a storage area in a storage device that corresponds to the determined storage area. A logical volume generation unit generates a new second stage logical volume, and a storage area extension unit extends a storage area of the first stage logical volume stored in the configuration information on the first stage logical volume to a desired storage capacity, and makes the new second stage logical volume generated by the logical volume generation unit correspond to the first stage logical volume.

7 Claims, 23 Drawing Sheets

FIG. 6

150 SLICE MANAGEMENT INFORMATION STORAGE UNIT

151 METADATA

| DISK NODE ID | SLICE ID | FLAG | LOGICAL VOLUME ID | SEGMENT ID | PAIRED DISK NODE ID | PAIRED SLICE ID |
|---|---|---|---|---|---|---|
| SN-A | 1 | P | LVOL1 | 1 | SN-B | 1 |
| SN-A | 2 | P | LVOL1 | 2 | SN-B | 2 |
| ... | ... | ... | ... | ... | ... | ... |
| SN-A | 11 | S | LVOL2 | 3 | SN-B | 11 |
| SN-A | 12 | S | LVOL2 | 4 | SN-B | 12 |
| ... | ... | ... | ... | ... | ... | ... |

152 REDUNDANT ALLOCATION TABLE

| DISK NODE ID | SLICE ID | LOGICAL VOLUME ID | SEGMENT ID |
|---|---|---|---|
| SN-A | | | |

FIG. 9

612 CONFIGURATION INFORMATION STORAGE UNIT FOR LOCAL LOGICAL VOLUME

*612a CONFIGURATION INFORMATION ON LOCAL LOGICAL VOLUME*

| LOCAL LOGICAL VOLUME | | | REMOTE LOGICAL VOLUME | | |
|---|---|---|---|---|---|
| LOGICAL VOLUME IDENTIFIER | INITIAL ADDRESS | END ADDRESS | LOGICAL VOLUME IDENTIFIER | INITIAL ADDRESS | END ADDRESS |
| LVOLX | L-a1 | L-a2 | LVOL1 | R1-a1 | R1-a2 |
| LVOLX | L-a3 | L-a4 | LVOL2 | R2-a1 | R2-a2 |

FIG. 10

613 CONFIGURATION INFORMATION STORAGE UNIT FOR REMOTE LOGICAL VOLUME

*613a CONFIGURATION INFORMATION ON REMOTE LOGICAL VOLUME*

| DISK NODE ID | SLICE ID | LOGICAL VOLUME ID | SEGMENT ID |
|---|---|---|---|
| SN-A | 1 | LVOL1 | 1 |
| SN-A | 2 | LVOL1 | 2 |
| ⋮ | ⋮ | ⋮ | ⋮ |
| SN-B | 1 | LVOL2 | 1 |
| SN-B | 2 | LVOL2 | 2 |
| ⋮ | ⋮ | ⋮ | ⋮ |

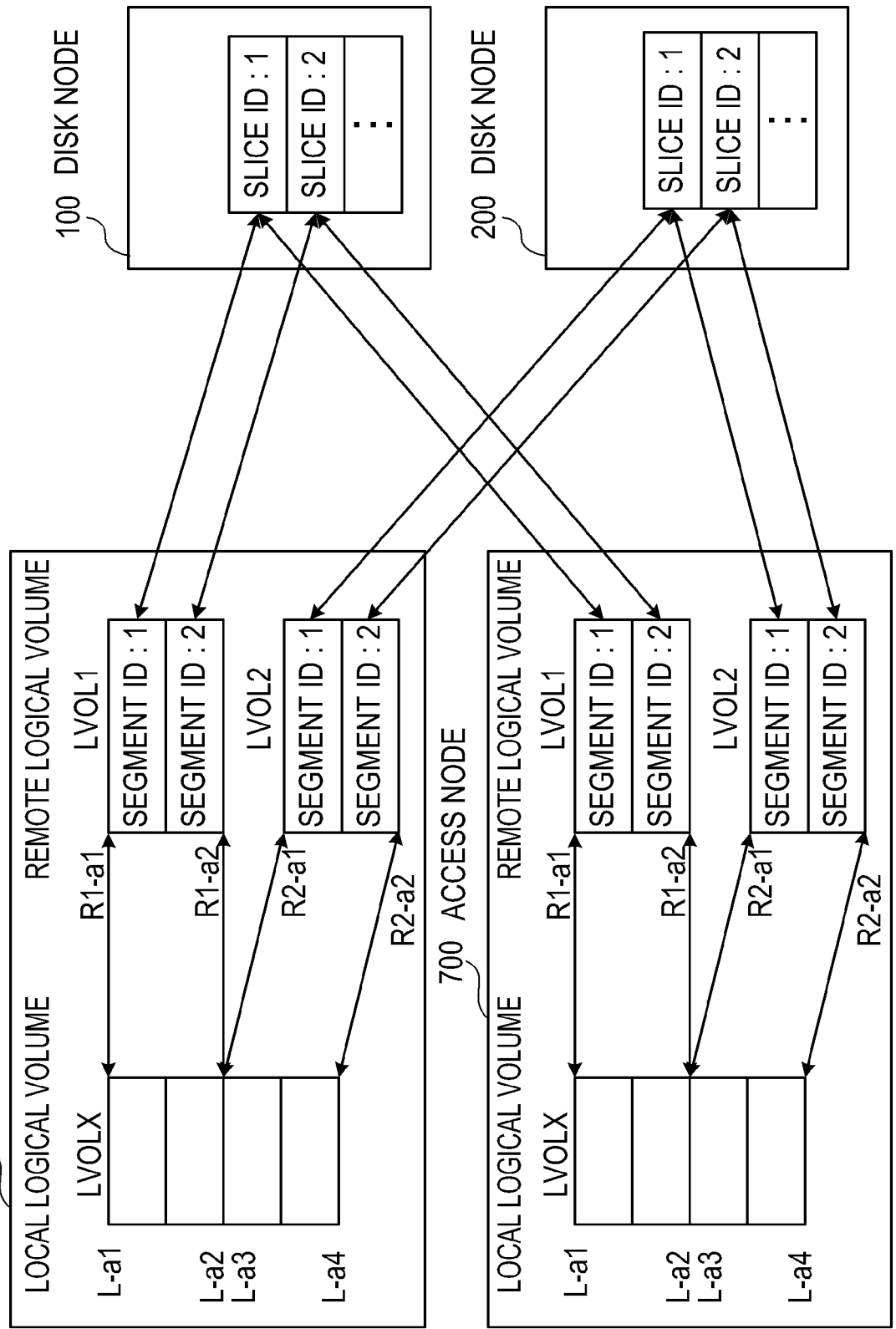

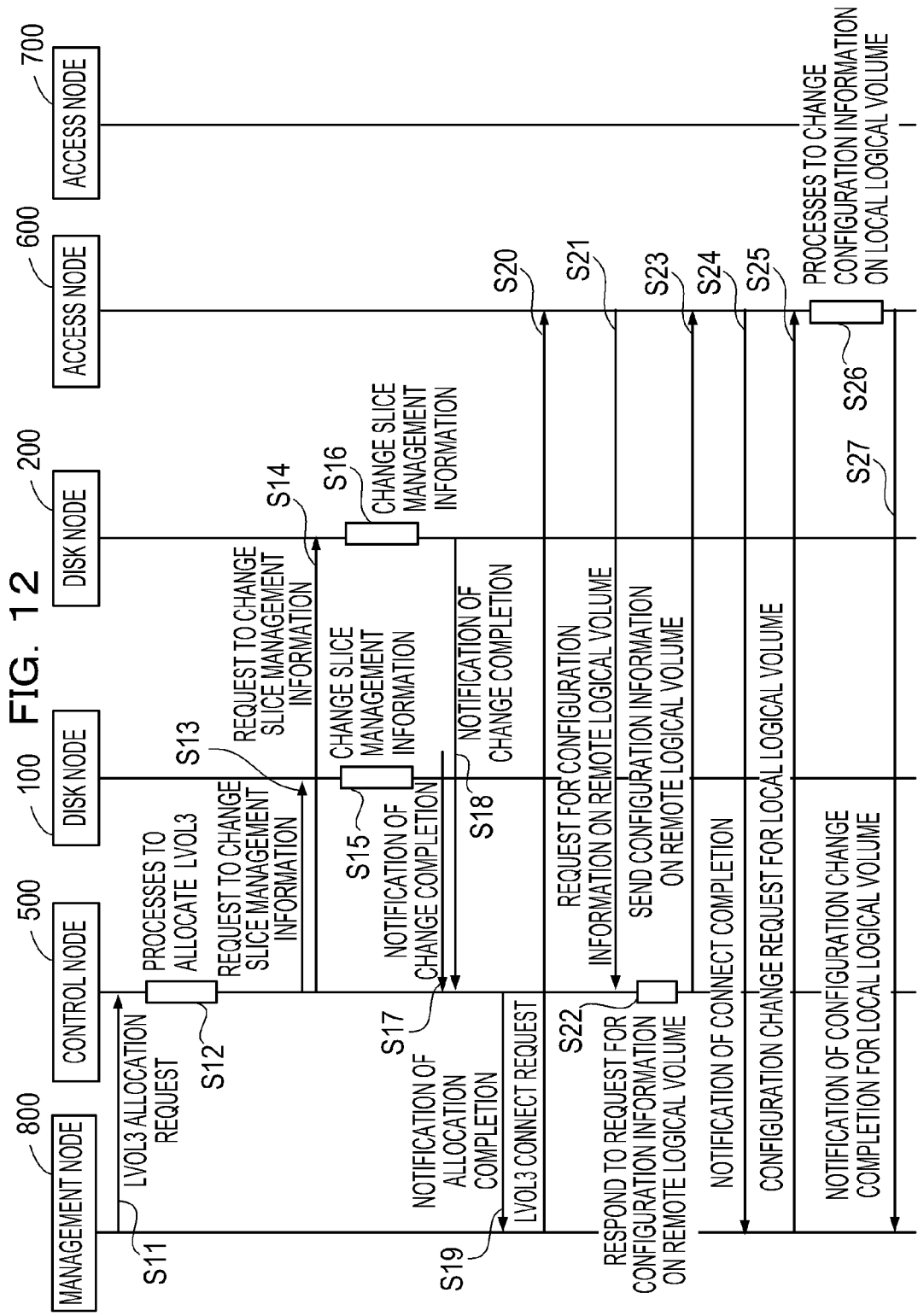

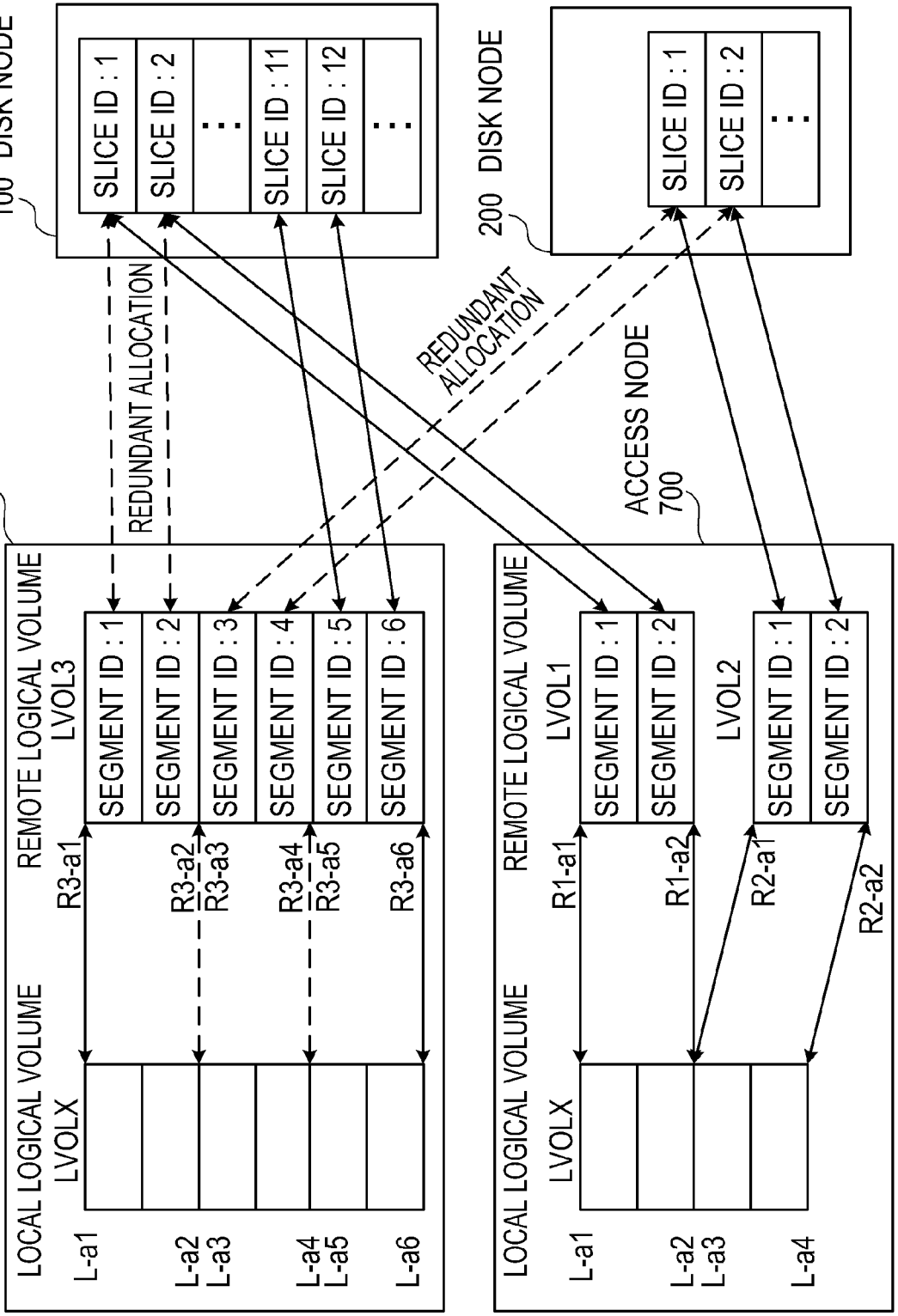

FIG. 14

150 SLICE MANAGEMENT INFORMATION STORAGE UNIT

151 METADATA

| DISK NODE ID | SLICE ID | FLAG | LOGICAL VOLUME ID | SEGMENT ID | PAIRED DISK NODE ID | PAIRED SLICE ID |
|---|---|---|---|---|---|---|
| SN-A | 1 | P | LVOL1 | 1 | SN-B | 1 |
| SN-A | 2 | P | LVOL1 | 2 | SN-B | 2 |
| ... | ... | ... | ... | ... | ... | ... |
| SN-A | 11 | S | LVOL2 | 3 | SN-B | 11 |
| SN-A | 12 | S | LVOL2 | 4 | SN-B | 12 |
| ... | ... | ... | ... | ... | ... | ... |
| SN-A | 21 | P | LVOL3 | 5 | SN-B | 21 |
| SN-A | 22 | P | LVOL3 | 6 | SN-B | 22 |
| ... | ... | ... | ... | ... | ... | ... |

152 REDUNDANT ALLOCATION TABLE

| DISK NODE ID | SLICE ID | LOGICAL VOLUME ID | SEGMENT ID |
|---|---|---|---|
| SN-A | 1 | LVOL3 | 1 |
| SN-A | 2 | LVOL3 | 2 |
| ... | ... | ... | ... |
| SN-A | 11 | LVOL3 | 3 |
| SN-A | 12 | LVOL3 | 4 |
| ... | ... | ... | ... |

FIG. 15

612 CONFIGURATION INFORMATION STORAGE UNIT FOR LOCAL LOGICAL VOLUME

612a CONFIGURATION INFORMATION ON LOCAL LOGICAL VOLUME

| LOCAL LOGICAL VOLUME | | | REMOTE LOGICAL VOLUME | | |
|---|---|---|---|---|---|
| LOGICAL VOLUME IDENTIFIER | INITIAL ADDRESS | END ADDRESS | LOGICAL VOLUME IDENTIFIER | INITIAL ADDRESS | END ADDRESS |
| LVOLX | L–a1 | L–a6 | LVOL3 | R3–a1 | R3–a6 |

FIG. 16

613 CONFIGURATION INFORMATION STORAGE UNIT FOR REMOTE LOGICAL VOLUME

613a CONFIGURATION INFORMATION ON REMOTE LOGICAL VOLUME

| DISK NODE ID | SLICE ID | LOGICAL VOLUME ID | SEGMENT ID |
|---|---|---|---|
| SN-A | 1 | LVOL1 | 1 |
| SN-A | 2 | LVOL1 | 2 |
| ⋮ | ⋮ | ⋮ | ⋮ |
| SN-B | 1 | LVOL2 | 1 |
| SN-B | 2 | LVOL2 | 2 |
| ⋮ | ⋮ | ⋮ | ⋮ |
| SN-A | 1 | LVOL3 | 1 |
| SN-A | 2 | LVOL3 | 2 |
| SN-B | 1 | LVOL3 | 3 |
| SN-B | 2 | LVOL3 | 4 |
| SN-A | 11 | LVOL3 | 5 |
| SN-A | 12 | LVOL3 | 6 |
| ⋮ | ⋮ | ⋮ | ⋮ |

FIG. 19

150 SLICE MANAGEMENT INFORMATION STORAGE UNIT

151 METADATA

| DISK NODE ID | SLICE ID | FLAG | LOGICAL VOLUME ID | SEGMENT ID | PAIRED DISK NODE ID | PAIRED SLICE ID |
|---|---|---|---|---|---|---|
| SN-A | 1 | P | LVOL3 | 1 | SN-B | 1 |
| SN-A | 2 | P | LVOL3 | 2 | SN-B | 2 |
| ... | ... | ... | ... | ... | ... | ... |
| SN-A | 11 | S | LVOL3 | 3 | SN-B | 11 |
| SN-A | 12 | S | LVOL3 | 4 | SN-B | 12 |
| ... | ... | ... | ... | ... | ... | ... |
| SN-A | 21 | P | LVOL3 | 5 | SN-B | 21 |
| SN-A | 22 | P | LVOL3 | 6 | SN-B | 22 |
| ... | ... | ... | ... | ... | ... | ... |

152 REDUNDANT ALLOCATION TABLE

| DISK NODE ID | SLICE ID | LOGICAL VOLUME ID | SEGMENT ID |
|---|---|---|---|
| SN-A | | | |

FIG. 20

613 CONFIGURATION INFORMATION STORAGE UNIT FOR REMOTE LOGICAL VOLUME

613a CONFIGURATION INFORMATION ON REMOTE LOGICAL VOLUME

| DISK NODE ID | SLICE ID | LOGICAL VOLUME ID | SEGMENT ID |
|---|---|---|---|
| SN-A | 1 | LVOL3 | 1 |
| SN-A | 2 | LVOL3 | 2 |
| SN-B | 1 | LVOL3 | 3 |
| SN-B | 2 | LVOL3 | 4 |
| SN-A | 11 | LVOL3 | 5 |
| SN-A | 12 | LVOL3 | 6 |
| ⋮ | ⋮ | ⋮ | ⋮ |

APPARATUS AND METHOD FOR MANAGING LOGICAL VOLUME IN DISTRIBUTED STORAGE SYSTEMS

CROSS-REFERENCE TO RELATED APPLICATIONS

This application is related to and claims priority to Japanese patent application no. 2008-43134 filed on Feb. 25, 2008 in the Japan Patent Office, and incorporated by reference herein.

FIELD

An aspect of the present invention is related to an apparatus and a method for managing a logical volume, and a distributed storage system, and in particular, relates to such apparatus, methods, and systems that can extend a storage area.

BACKGROUND

In a large-scale computer system, a logical volume which combines a plurality of disk devices (called a virtual volume as well) may be defined. In a logical volume, correspondence relationships between a logical block number used by an application for accessing (logical block number), and one disk device among a plurality of disk devices and a block number of the disk device (physical block number) are defined. Thus, the application can access a block by designating the logical block number and uniquely identifying the corresponding disk device and physical block number. A Redundant Array of Independent Disks (RAID) system having a plurality of disk devices may be used as one disk device to allocate to a logical volume.

In a system using such logical volume, the amount of data stored into a logical volume is gradually increased after long operation. Then, there arises a need to extend storage capacity. When storage capacity of a logical volume is extended, a disk device is additionally allocated to the logical volume. By increasing disk devices to be allocated to the logical volume, the storage capacity provided to an application by the logical volume increases as well.

However, in order to extend a storage area of the logical volume, the use of the logical volume needs to be temporarily discontinued and a new storage area needs to be defined. In this case, the operation of logical volume is temporarily discontinued. Thus, a technique is considered that allows extending a storage area without discontinuing use of a logical volume. For example, a plurality of volumes (internal logical volume) and logical volume recognized externally (external logical volume) can be provided. Then the correspondence relationship between the internal logical volume and the external logical volume is redefined during operation. This enables extension of the logical volume from the perspective of a computing machine.

Data volume in a management table increases as storage capacity of the logical volume increases, when allocation of disk devices to a logical volume is managed by the table. For example, when disk devices allocated to the logical volume are increased in order to increase storage capacity of the logical volume, information to manage the correspondence relationship increases as well. The management table needs to be stored in a memory during operation. Therefore, the increase in capacity of the management table results in increase in usage of the memory resource.

A technique to reduce the volume of the memory resource required for storing a management table has been considered. For instance, all management data in the management table can be allocated to a disk drive, only storing the required part in the memory each time, so the usage of memory is reduced.

By applying the above technique, disk devices allocated to a logical volume can be reconfigured. This reconfiguration function allows replacing a disk device allocated to the logical volume with another disk device. For example, a plurality of disk devices allocated to a logical volume can be replaced with a single disk device with larger storage capacity. This replacement reduces the number of disk devices allocated to the logical volume, thereby reducing data volume of the management table.

There may be a case where only a limited number of disk devices can be allocated to a logical volume even if reducing usage of memory for storing the management table by applying the above technique is possible. In this case, as a system bloats, disk devices allocated to a logical volume need to be replaced with disk devices with larger storage capacity to reduce the number of disk devices.

However, a large amount of stored data needs to be copied when disk devices allocated to a logical volume are replaced. Copying all data in the disk devices may increase the amount of data on communication paths among disk devices. This lowers the efficiency of other data communication in the communication path. Frequent input and output to the disk device that is being copied deteriorates access efficiency to relevant disk devices for providing services under operation.

SUMMARY

According to an aspect of the invention, an apparatus includes a logical volume management apparatus executing processes to allocate a storage area to a logical volume. The apparatus includes a first storage unit that stores configuration information on a first stage logical volume to which correspondence relationship of storage areas between the first stage logical volume and at least one second stage logical volume is registered, and a second storage unit that stores configuration information on the second stage logical volume to which correspondence relationship of storage areas between the second stage logical volume and at least one storage device is registered. An access unit refers to the configuration information on the first stage logical volume in response to an access request designating a storage area in the first stage logical volume, and finds a storage area in the second stage logical volume that corresponds to the first stage logical volume designated by the access request, refers to the configuration information on the second stage logical volume and accesses a storage area in the storage device that corresponds to the determined storage area in the second stage logical volume. A logical volume generation unit generates, in response to a request to extend a storage area of the first stage logical volume, a new second stage logical volume to which the following are allocated: a storage area in the storage device allocated to the second stage logical volume and a storage area in the storage device, the size of which is equivalent to a difference between the storage capacity designated by the storage area extension request and the storage capacity of the first stage logical volume before extension, and then registers the correspondence relationship of storage areas between the new second stage logical volume and the storage device to the configuration information on the second stage logical volume, and a storage area extension unit that extends the storage area of the first stage logical volume stored in the configuration information on the first stage logical volume to the storage capacity designated by the storage area extension request, and makes the new second stage logical volume generated by the logical volume generation unit correspond to the first stage logical volume with extended storage area.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 6 is a diagram for an example of a data structure of slice management information in a disk node;

FIG. 9 is a diagram for an example of a data structure of a configuration information storage unit for local logical volume;

FIG. 10 is a diagram for an example of a data structure of a configuration information storage unit for remote logical volume;

FIG. 11 is a pattern diagram for an access environment from access nodes to disk nodes;

FIG. 12 is a sequence diagram for a first half of processes to extend storage capacity of a local logical volume;

FIG. 13 is a pattern diagram for an access environment from access nodes to disk nodes with redundant allocation;

FIG. 14 is a diagram for slice management information after redundant allocation is applied;

FIG. 15 is a diagram for configuration information on a local logical volume after extending a storage area;

FIG. 16 is a diagram for configuration information on a remote logical volume after extending a storage area;

FIG. 19 is a diagram for slice management information after cancelling redundant allocation;

FIG. 20 is a diagram for configuration information on a remote logical volume after cancelling redundant allocation;

DESCRIPTION OF EMBODIMENT

Hereunder, an embodiment is disclosed in detail by referring to the accompanying drawings.

Figure 1:
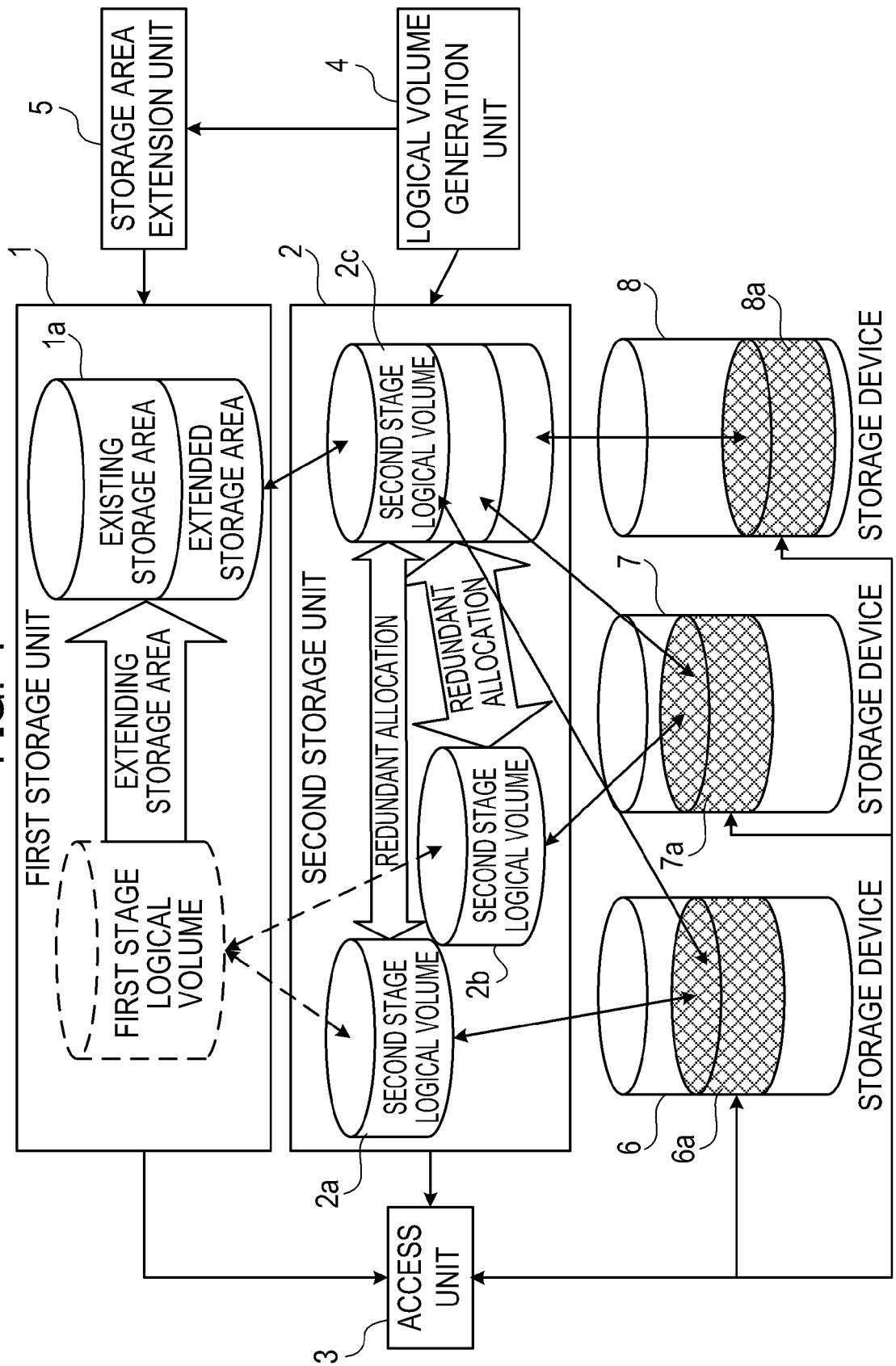
FIG. 1 is a diagram for an overview of an embodiment.

FIG. 1 is a diagram for an overview of an embodiment. A logical volume management apparatus includes a first storage unit 1, a second storage unit 2, an access unit 3, a logical volume generation unit 4, and a storage area extension unit 5.

The first storage unit 1 stores configuration information on a first stage logical volume to which correspondence relationship between storage areas of a first stage logical volume 1a and at least one of second stage logical volumes 2a, 2b, or 2c is registered. In an example of FIG. 1 two second stage logical volumes 2a and 2b are made to correspond to the first logical volume before extending the storage area. The second storage unit 2 stores configuration information on a second stage logical volume to which correspondence relationship of storage areas between second stage logical volumes 2a, 2b, and 2c and at least one of storage devices from 6 to 8 are registered. In an example of FIG. 1, only the second stage logical volumes 2a and 2b exist before extending the storage area. The second stage logical volume 2a is made to correspond to a storage area 6a of the storage device 6. The second stage logical volume 2b is made to correspond to a storage area 7a of the storage device 7. In response to an access request designating a storage area in the first stage logical volume 1a, an access unit 3 refers to configuration information on the first stage logical volume and determines a storage area in the second stage logical volumes 2a, 2b, and 2c that corresponds to the first logical volume 1a designated by the access request. Moreover, the access unit 3 refers to configuration information on the second stage logical volume, and accesses the storage area in the storage device that corresponds to the determined storage area in the second stage logical volume. In response to a request to extend the designated amount of a storage area in the first stage logical volume 1a, the logical volume generation unit 4 generates a new second stage logical volume 2c to which the following is allocated: that is, storage areas 6a and 7a in storage devices 6 and 7 that are allocated to the second stage logical volumes 2a and 2b respectively and a storage area 8a in a storage device 8 that is equivalent to a difference between the storage capacity designated by the storage area extension request and the storage capacity of the first stage logical volume before extension. Then, the logical volume generation unit 4 registers the correspondence relationship of storage areas between the new second stage logical volume 2c and storage devices 6 to 8 to configuration information on the second stage logical volume. A storage area extension unit 5 extends the storage area of the first stage logical volume 1a stored in the configuration information on the first stage logical volume to the storage capacity designated by the storage area extension request. After that, the storage area extension unit 5 makes the new second stage logical volume 2c generated by the logical volume generation unit 4 correspond to the first stage logical volume 1a with extended storage area. According to such logical volume management device, when a request for extending storage area is input, a new second stage logical volume 2c is generated to which the storage areas 6a and 7a of storage devices 6 and 7, and the storage area 8a of the storage device 8 which corresponds to the amount extended are allocated. Accordingly the new second stage logical volume 2c is allocated to the first stage logical volume 1a with extended storage area. After that, when an access request is input; the access unit 3 finds the new second stage logical volume 2c corresponding to a storage area in the first stage logical volume subject to the access. Then, an access is made to a storage area in either one of storage devices 6 to 8 corresponding to the determined storage area.

In this manner, a storage area of the first stage logical volume 1a is extended. At this time, the storage areas 6a and 7a of storage devices 6 and 7 are redundantly allocated to both the existing second stage logical volumes 2a and 2b and the new second stage logical volume 2c. This means the storage 6a and 7a of storage devices 6 and 7 are accessible both from the existing second stage logical volumes 2a and 2b and the new second stage logical volume 2c. As a result, the data accessed via the existing second stage logical volume 2a and 2b is accessible via the new second stage logical volume 2c as well. Therefore copying data in the storage area 6a and 7a of storage devices 6 and 7 as a result of creating the new second logical volume 2c is unnecessary.

Moreover, the newly created second stage logical volume 2c has storage capacity equivalent to the total amount of the existing second stage logical volumes 2a and 2b in addition to the extended storage capacity. Thus, only a second stage logical volume 2c needs to be allocated to the extended first stage logical volume 1a. This allows extending storage areas of the first stage logical volume 1a without exceeding the maximum number of volumes that can be allocated. This two-stage logical volume configuration can be achieved in one computer. Alternatively the correspondence relationship of storage areas between the second stage logical volume and storage devices may be managed by coordinating with an external computer. For example, a distributed storage system may have a function to define a storage function of a disk node connected via a network to an access node as a logical volume (corresponds to the second stage logical volume in FIG. 1), and then remotely accessing from the access node to the disk node via the network. In this case, a logical volume (corresponding to the first logical volume in FIG. 1) is defined by a local disk access function in the access node, and then a logical volume defined for a remote access can be allocated to the defined logical volume. This enables two-stage logical volume configuration by using a logical volume for local access as a first stage, and a logical volume for remote access as a second stage. The distributed storage system allows easy addition of a storage device. Thus, extending storage capacity of the first stage logical volume can be easily achieved by allocating a logical volume for remote access of the distributed storage system as the second stage logical volume; thereby extending the storage capacity of the first stage logical volume can be easily achieved as well. Hereunder, an embodiment using a distributed storage system is explained in detail.

Figure 2:
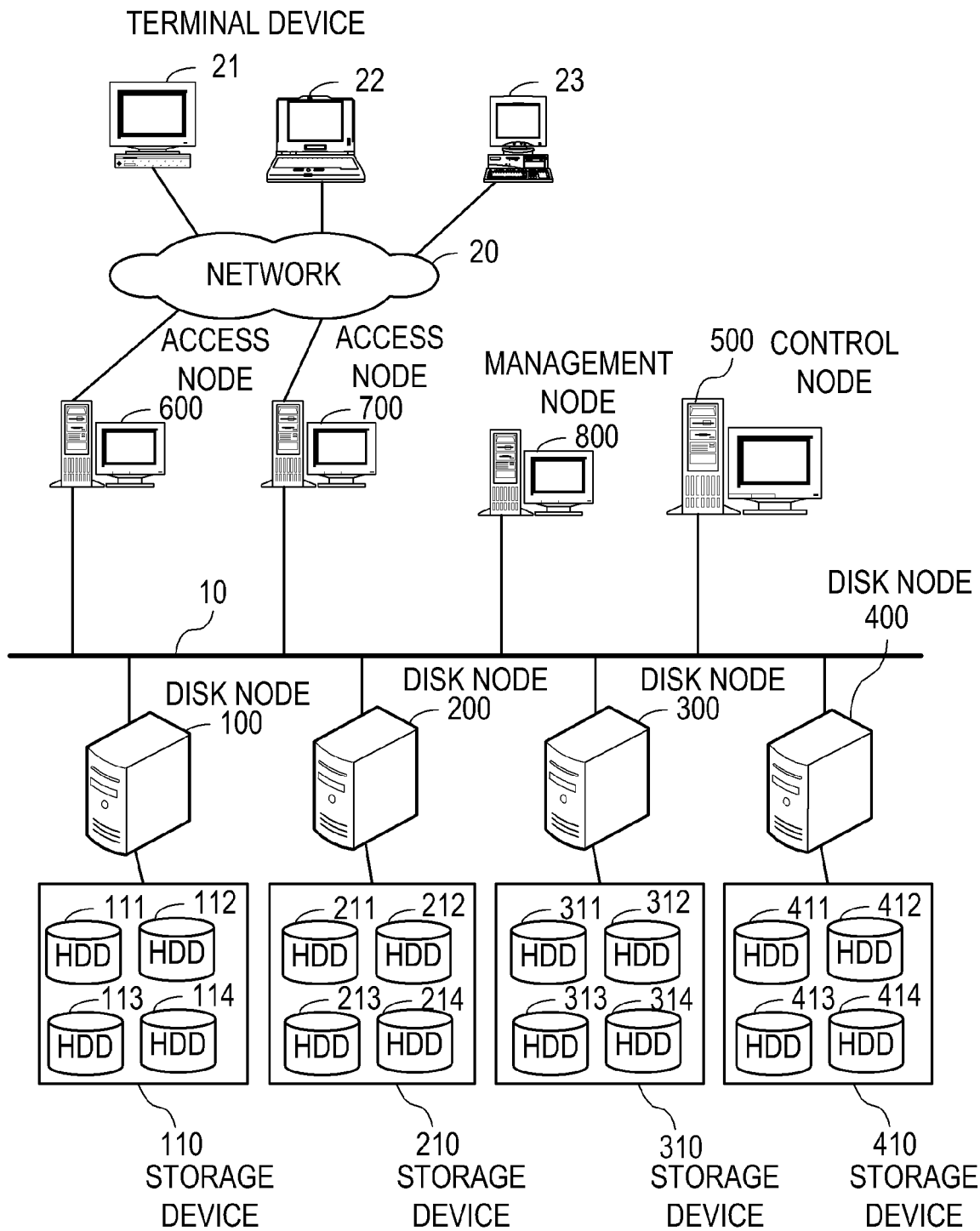
FIG. 2 is a diagram for a configuration example of a distributed storage system of an embodiment.

FIG. 2 is a diagram for a configuration example of a distributed storage system of an embodiment. According to this embodiment, a plurality of disk nodes 100, 200, 300, and 400, a control node 500, access nodes 600 and 700, and a management node 800 are connected via a network 10. Storage devices 110, 210, 310, and 410 are connected to the disk nodes 100, 200, 300, and 400 respectively.

A storage device 110 includes a plurality of hard disk drives (HDDs) 111, 112, 113, and 114. A storage device 210 includes a plurality of HDDs 211, 212, 213, and 214. A storage device 310 includes a plurality of HDDs 311, 312, 313, and 314. A storage device 410 includes a plurality of HDD 411, 412, 413, and 414. Each of the storage devices 110, 210, 310, and 410 are a RAID system with built in HDDs.

According to this embodiment, each of storage devices 110, 210, 310, and 410 provides RAID-5 disk management service.

Disk nodes 100, 200, 300, and 400 are, for example, computers with Intel Architecture (IA). The disk nodes 100, 200, 300, and 400 manage data stored in the connected storage devices 110, 210, 310, and 410 and provide the managing data to terminals 21, 22, and 23 via the network 10. Moreover, the disk nodes 100, 200, 300, and 400 manage redundant data. This means that the identical data is managed at least by the two disk nodes.

The control node 500 manages disk nodes 100, 200, 300, and 400. For example, when the node 500 receives a request to allocate a new remote logical volume from the management node 800, the node 500 defines the new remote logical volume, and then sends the definition to the disk nodes 100, 200, 300, and 400, and the access nodes 600 and 700. As a result, accesses from access node 600 and 700 to the disk nodes 100, 200, 300, and 400 via the newly defined remote logical volume are enabled.

A plurality of terminal devices 21, 22, and 23 are connected to the access nodes 600 and 700 via a network 20. A logical volume and a remote volume are defined for the access nodes 600 and 700. Then, in response to access requests to the local logical volume from the terminal devices 21, 22, and 23, the access nodes 600 and 700 access the corresponding data in the disk nodes 100, 200, 300, and 400 defined by the remote logical volume.

The management node 800 is a computer used by an administrator to manage operation of the distributed storage system. The management node 800 collects information on utilization of local and remote logical volumes, and displays the operation statuses on the screen. If the administrator confirms that available disk space is low, the administrator can instruct to extend storage capacity of the logical volume via the management node 800. Upon receiving the instruction, the distributed storage system initiates processes to extend the storage area of a local logical volume.

Figure 3:
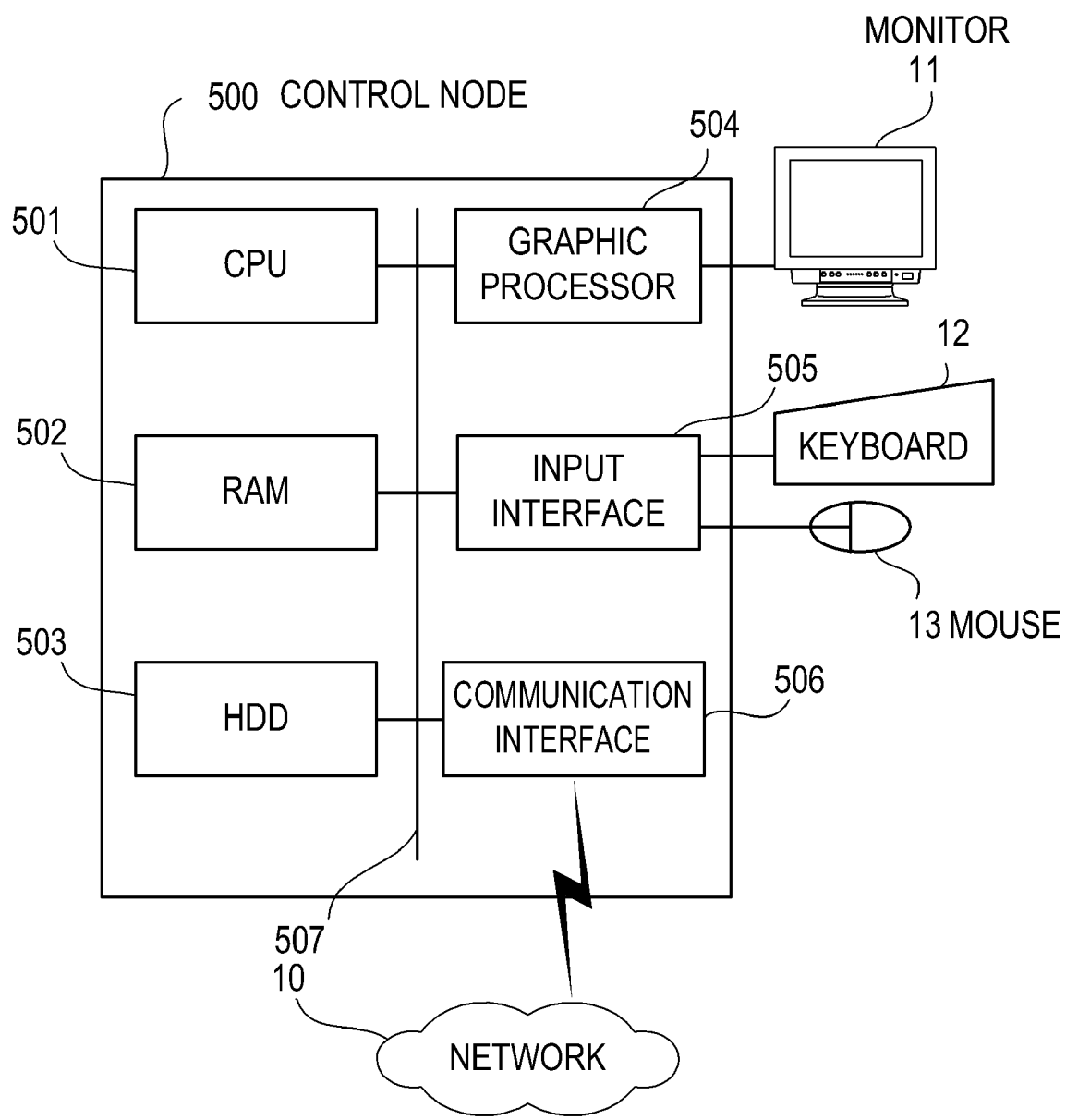
FIG. 3 is a diagram for an example hardware configuration of a control node used for an embodiment.

FIG. 3 is an example hardware configuration of a control node used for an embodiment. An entire control node 500 is controlled by a central processing unit (CPU) 501. A random access memory (RAM) 502, a hard disk drive (HDD) 503, a graphic processor 504, an input interface 505, and a communication interface 506 are connected to the CPU 501 via a bus 507.

The RAM 502 temporarily stores at least a part of an operating system (OS) or application programs executed by the CPU 501. The RAM 502 stores various data required for processing by the CPU 501. The HDD 503 stores the OS and application programs.

A monitor 11 is connected to the graphic processor 504. The processor 504 displays images on the monitor 11 according to instructions from the CPU 501. A keyboard 12 and a mouse 13 are connected to the input interface 505. The interface 505 transmits signals sent from the keyboard 12 and the mouse 13 to the CPU 501 via the bus 507.

A communication interface 506 is connected to a network 10. The interface 506 sends and receives data to and from other computers via the network 10.

The processing function of this embodiment can be achieved by the above hardware configuration. Although FIG. 3 is the hardware configuration of the control node 500, the disk nodes 100, 200, 300, and 400, the access nodes 600 and 700, and the management node 800 can be achieved by the same hardware configuration as well. As shown in FIG. 2, a plurality of disk nodes 100, 200, 300, and 400 are connected to the network 10, and can be accessed from access nodes 600 and 700. This distributed storage system functions as a virtual volume (logical volume) for the access nodes 600 and 700.

Figure 4:
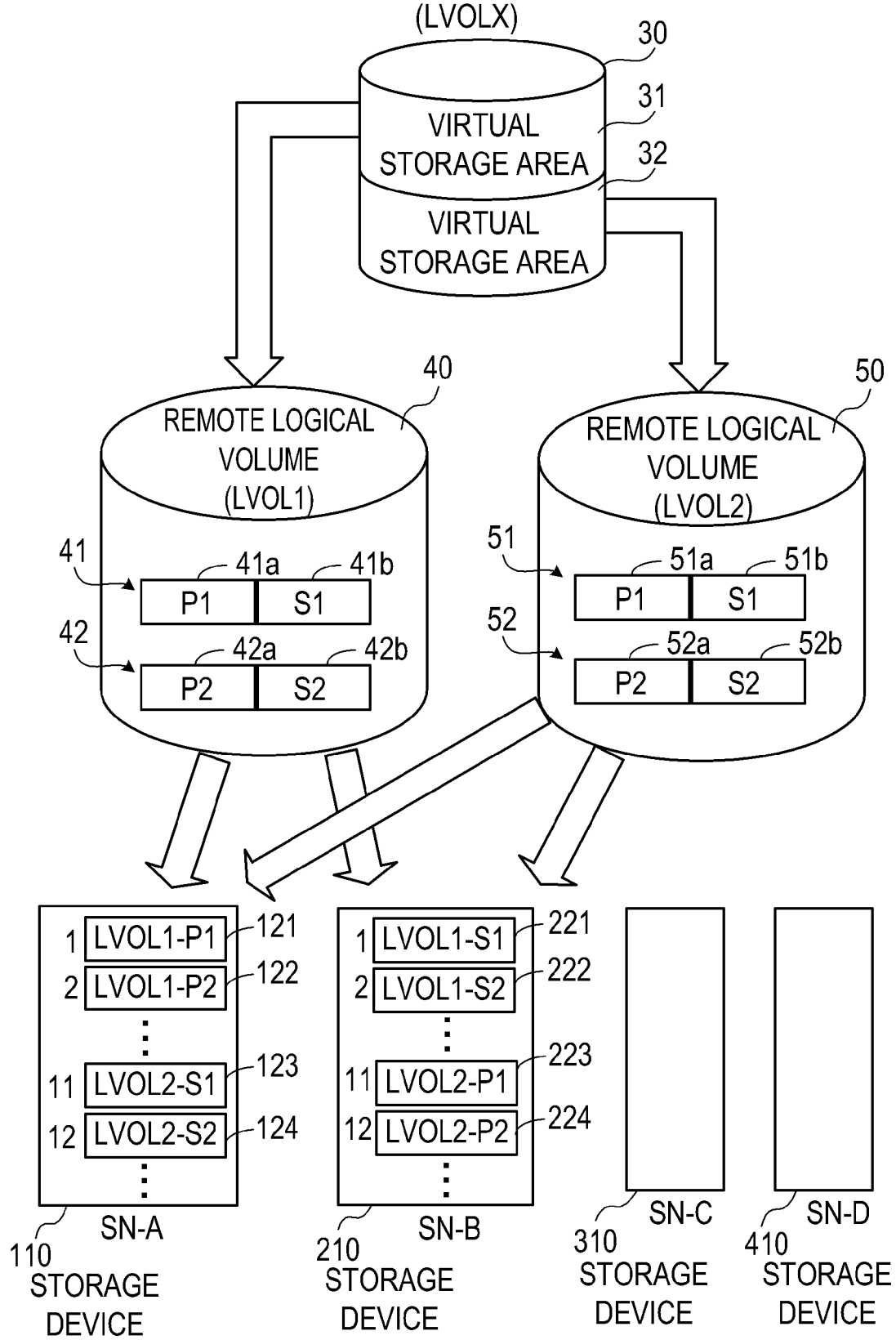
FIG. 4 is a diagram for a data structure of a logical volume.

FIG. 4 is a diagram for a data structure of a logical volume. According to this embodiment, local volumes are configured by two-stages of a local logical volume 30 and remote logical volumes 40 and 50. A local volume identifier for the logical volume 30 shall be "LVOLX", that for the volume 40 shall be "LVOLX1", and that for the volume 50 shall be "LVOLX2" respectively.

Four disk nodes 100, 200, 300, and 400 connected via a network are assigned to node identifiers to identify each node. That is SN-A for the disk node 100, SN-B for the disk node 200, SN-C for the disk node 300, and SN-D for the disk node 400. The storage devices 110, 210, 310, and 410 connected to each of disk nodes 100, 200, 300, and 400 respectively are uniquely identified by the node identifiers on the network 10.

A RAID-5 storage system configured for each of storage devices 110, 210, 310 and 410 belongs to each of disk nodes 100, 200, 300, and 400 respectively. Storage functions provided by each of the storage devices 110, 210, 310, and 410 are managed by splitting into a plurality of slices.

Two virtual storage areas 31 and 32 are allocated to a logical volume 30. A logical volume 40 is allocated to the virtual storage area 31, and a remote logical volume 50 is allocated to the virtual logical volume 32.

A remote logical volume 40 includes units of segments 41 and 42. Storage capacity of segments 41 and 42 is the same as storage capacity of a slice that is the management unit for storage devices 110, 210, 310, and 410. For example, when storage capacity of a slice is 1 GB, the storage capacity of the segment is 1 GB as well. Storage capacity of the logical volume 700 is an integral multiple of storage capacity for one segment. When storage capacity of the segment is 1 GB, the storage capacity of the logical volume 700 will be 4 GB. The segments 41 and 42 include a pair of primary slices 41a and 42a, and the secondary slices 41b and 42b respectively.

In the example of FIG. 4, virtual storage areas 31 and 32 have storage areas equivalent to the amount of two segments respectively. Therefore a remote logical volume having two segments corresponds to a single virtual storage.

A remote logical volume 50 includes a plurality of segments 51 and 52. Each of segments 51 and 52 includes a pair of primary slices 51a and 52a and the secondary slices 51b and 52b respectively.

Slices belonging to the same segment belong to different disk nodes. Areas managing an individual slice include flags in addition to logical volume identifiers and slice information comprising the same segment. Values indicating such volumes as a primary or a secondary are stored in the flag.

In an example of FIG. 4, identifiers of slices in remote logical volumes 40 and 50 are represented by a combination of alphabets, "P" or "S" and numerical characters. The "P" indicates the primary slice, while "S" indicates the secondary slice. The numerical character after the alphabet letters indicates what segment number the slice belongs to. For example, a primary slice of the first segment 41 is represented by "P1" and the secondary slice is represented by "S1".

Slices of remote logical volumes 40 and 50 corresponding to each slice in storage devices 110, 210, 310, and 410 are represented by the identifiers for the logical volume and that for the slice.

This two-stage structure of logical volume allows unique correspondence between a storage area in the local logical volume 30 (e.g., one block) and a storage area in the storage devices 110, 210, 310, and 410. Then, each of storage devices 110, 210, 310, and 410 stores data corresponding to its own slice.

Figure 5:
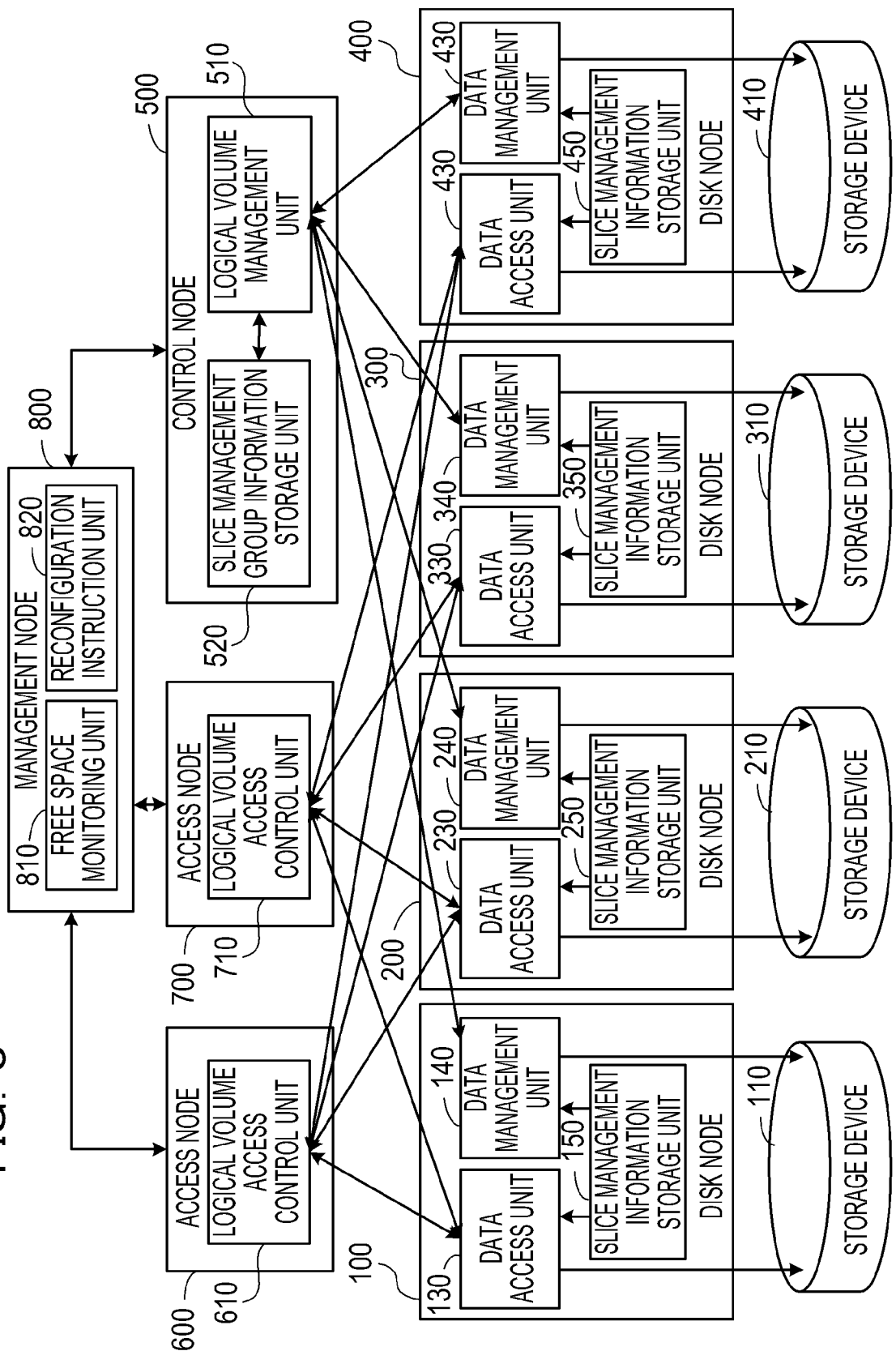
FIG. 5 is a block diagram for functions of devices in the distributed storage system.

FIG. 5 is a block diagram for functions of devices in the distributed storage system. An access node 600 includes a logical volume access control unit 610. In response to an access request designating data in the local logical volume 30 from the terminal devices 21, 22, and 23, the control unit 610 accesses disk nodes managing the designated data. More specifically, the logical volume access control unit 610 identifies a block in the local logical volume 30 to which the data to be accessed is stored. Then, the logical volume access control unit 610 identifies a remote logical volume corresponding to the identified block and the corresponding segment in the remote logical volume. Furthermore, the logical volume access control unit 610 identifies a disk node corresponding to a primary slice comprising a segment of the identified logical volume and a slice in the disk node. The logical volume access control unit 610 outputs a request to the identified disk node for accessing the identified slice.

The access node 700 includes a logical volume access control unit 710 as well. The functions of the logical volume access control unit 710 are the same as those of the logical volume access control unit 610 of the access node 600.

A control node 500 includes a logical volume management unit 510 and a slice management information group storage unit 520.

The logical volume management unit 510 manages slices in storage devices 110, 210, 310, and 410 belong to disk nodes 100, 200, 300, and 400. For example, the logical volume management unit 510 sends a request to acquire slice management information to disk nodes 100, 200, 300, and 400 at system start-up. Then, the logical volume management unit 510 stores the slice management information returned in response to the request in the slice management information group storage unit 520.

The slice management information group storage unit 520 stores slice information collected from disk nodes 100, 200, 300, and 400. For instance, a part of the RAM storage area in the control node 500 is used as the slice management information group storage unit 520.

The disk node 100 includes a data access unit 130, a data management unit 140, and a slice management information storage unit 150.

In response to a request by the access node 600, a data access unit 130 accesses data in a storage device 110. More specifically when the data access unit 130 receives a data read request from the access node 600, the data access unit 130 acquires the data designated by the read request from the storage device 110 and sends the data to the access node 600. When the data access unit 130 receives a data write request from the access node 600, the data access unit 130 stores data included in the write request in the storage device 110. When data is written based on the write request by the data access unit 130, a data management unit 140 of the disk node 100 updates data in a secondary slice by coordinating with a data management unit of a disk node managing the secondary slice corresponds to the slice (a primary slice) to which the data is written.

In response to a request to acquire slice management information from the logical volume management unit 510, the data management unit 140 sends slice management information stored in the slice management information storage unit 150 to the logical volume management unit 510.

The slice management information storage unit 150 stores slice management information. For instance, a part of RAM storage area is used as the slice management information storage unit 150. Slice management information stored in the slice management information storage unit 150 is stored in the storage device 110 at system shut-down, and read into the slice management information storage unit 150 at system start-up.

Other disk nodes 200, 300, and 400 provide the same functions as the disk node 100. Namely, the disk node 200 includes a data access unit 230, a data management unit 240, and a slice management information storage unit 250. The disk node 300 includes a data access unit 330, a data management unit 340, and a slice management information storage unit 350. The disk node 400 includes a data access unit 430, a data management unit 440, and a slice management information storage unit 450. Each component of disk nodes 200, 300, and 400 with the same name as that of the corresponding component of the disk node 100 has the same functions.

FIG. 6 is an example of data structure of slice management information in a disk node. The slice management information stored in the slice management unit storage unit 150 includes metadata 151 and a redundant allocation table 152. The metadata 151 is a data table to which management information on data stored in a storage area split into units of slices in the storage device 110 is registered. The metadata 151 has columns of disk node ID, slice ID, flag, logical volume ID, segment ID, paired disk node ID, and paired slice ID.

For the column of disk node ID, a node identifier for the disk node 100 having the metadata 151 is registered. For the column of slice ID, a slice number for uniquely identifying each slice in the storage device 110 is set. For the column of flag, a flag indicating whether a slice represented by a slice ID in the logical volume is a primary slice or a secondary slice is set. In an example of FIG. 6, a primary slice is represented by "P", while a secondary slice is represented by "S".

For the column of logical volume ID, a volume identifier indicating a remote logical volume corresponding to a slice indicated by the slice ID is set. For the column of segment ID, a segment ID indicating a segment in a remote logical volume corresponds to a slice indicated by the slice ID is set.

For the column of paired disk node ID, an identifier for a node of a disk node storing a slice which makes a pair with the slice indicated by a slice ID (a slice comprising the same segment) is set. For the column of paired slice ID, a slice number for uniquely identifying a slice which makes a pair with the slice indicated by the slice ID is set.

A redundant allocation table 152 stores management information on slices allocated to a plurality of remote logical volumes. The table 152 has columns of disk node ID, slice ID, logical volume IDs, and segment ID.

In the column of disk node ID, an identifier for a node of the disk node 100 that has metadata 151 is registered. In the column of slice ID, a slice number of a slice that is allocated redundantly is set. In the column of logical volume ID, an identifier for a remote logical volume (a remote logical volume to which a slice that has already been allocated to another remote logical volume is allocated) that is redundantly allocated is set.

In an example of FIG. 6, redundant allocation has not been performed yet, and columns other than the disk node ID in the redundant allocation table 152 are blank. This means that no redundant allocation data is registered in the initial state. Slice management information as above is stored in each of disk nodes 100, 200, 300, and 400 and sent to the control node 500 at system start-up. The node 500 stores slice management information acquired from each of disk nodes 100, 200, 300, and 400 in the slice management information group storage unit 520.

Figure 7:
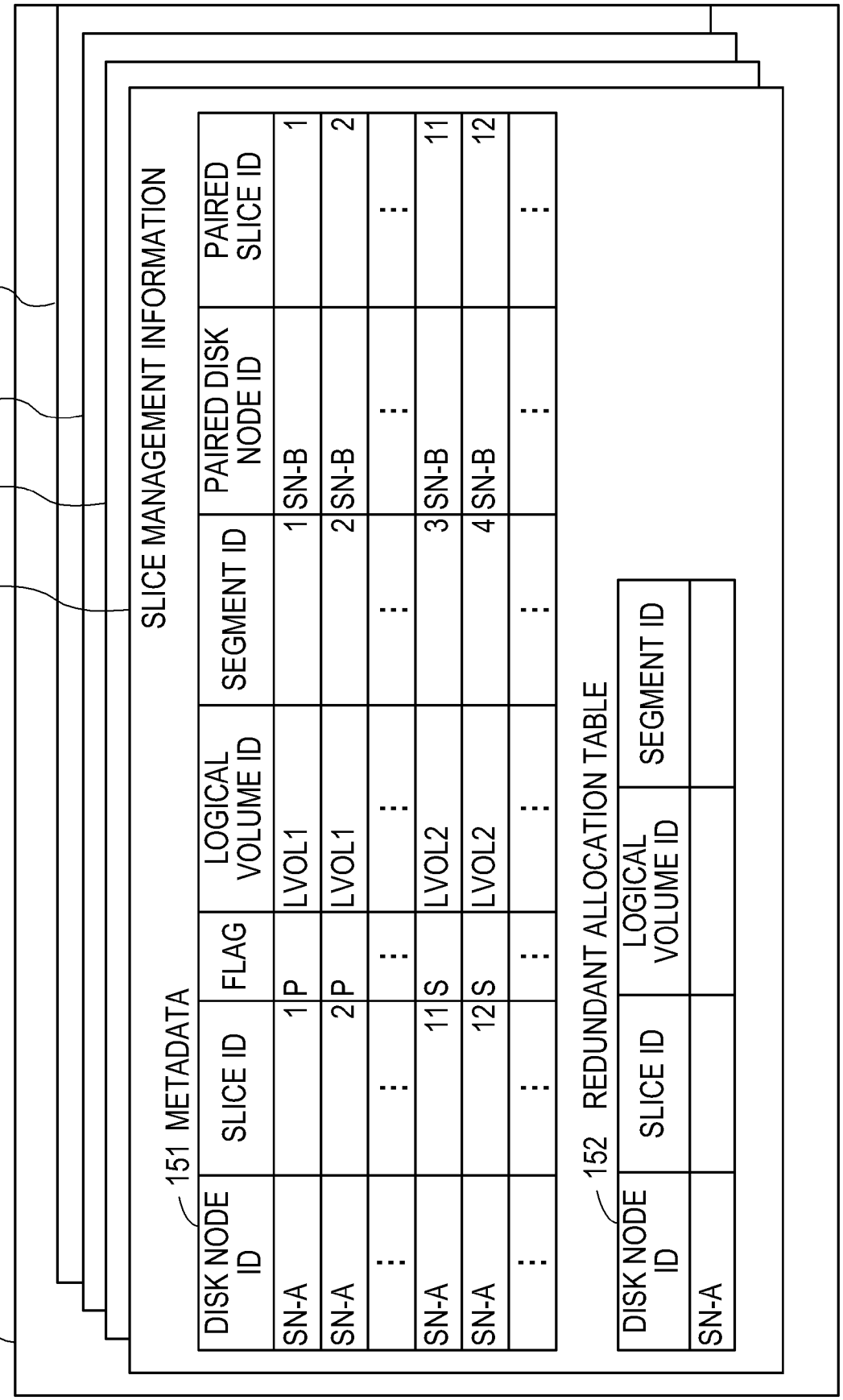
FIG. 7 is a diagram for an example of a data structure of a slice management information group storage unit.

FIG. 7 is a diagram for an example of a data structure of a slice management information group storage unit. A slice management information group storage unit 520 stores slice management information collected from each of disk nodes 100, 200, 300, and 400. Data structures of each of slice management information from 521 to 524 are as shown in FIG. 6.

Now, a logical volume access control unit 610 of an access node 600 will be described.

Figure 8:
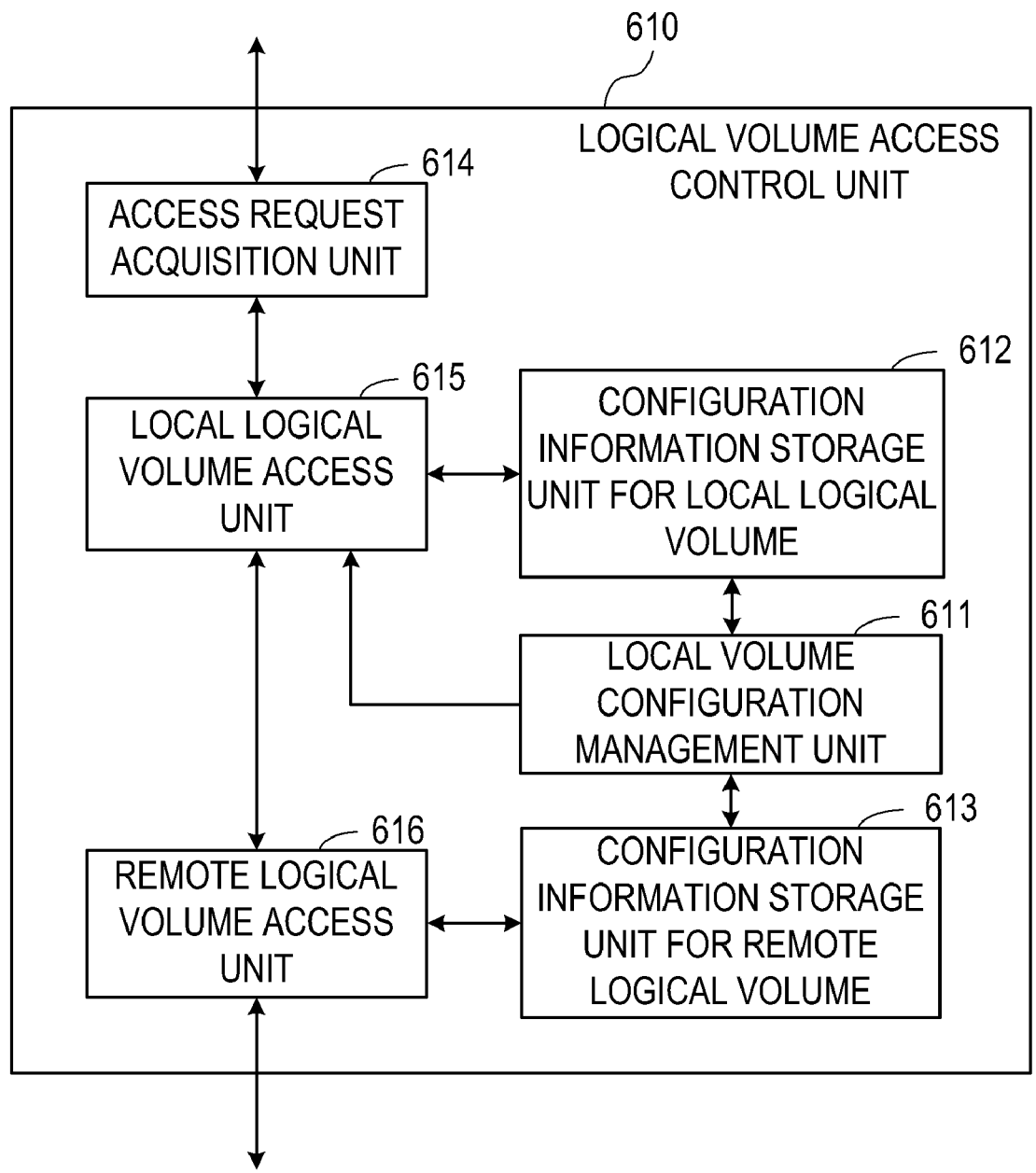
FIG. 8 is a block diagram for functions of a logical volume access control unit.

FIG. 8 is a block diagram for functions of a logical volume access control unit. The logical volume access control unit 610 includes a logical volume configuration management unit 611, a configuration information storage unit for local logical volume 612, a configuration information storage unit for remote logical volume 613, an access request acquisition unit 614, a local logical volume access unit 615, and a remote logical volume access unit 616.

The logical volume configuration management unit 611 updates contents of the configuration information storage unit for local logical volume 612 and the configuration information storage unit for remote logical volume 613 based on a request to change the logical volume configuration from the control node 500. The configuration information storage unit for local logical volume 612 stores configuration information on local logical volume indicating correspondence relationship between a local logical volume and a remote logical volume. The configuration information storage unit for remote logical volume 613 stores configuration information on remote logical volume indicating a correspondence relationship of storage areas between the remote logical volume and storage area of storage devices 110, 210, 310, and 410 managed by disk nodes 100, 200, 300, and 400.

The access request acquisition unit 614 acquires access requests sent from terminal devices from 21 to 23 connected via a network 20. In the access requests sent from the terminal devices from 21 to 23, data to be accessed is designated by an address in a local logical volume 30 (a block number of a block to which data is stored and the position of data in the block). The acquisition unit 614 passes the acquired access request to the local logical volume access unit 615. When the acquisition unit 614 receives the result of access for the access request from the access unit 615, it sends the result of access to the terminal device that output the access request. When the local logical volume access unit 615 receives an access request from the access request acquisition unit 614, the local logical volume access unit 615 refers to configuration information on local logical volume in the configuration information storage unit for local logical volume 612. Subsequently the local logical volume access unit 615 identifies an address in a remote logical volume that includes data to be accessed (an ID of a segment that includes a block in a local logical volume to be accessed). Then the local logical volume access unit 615 passes the access request designating the address in the remote logical volume to a remote logical volume access unit 616. When the local logical volume access unit 615 receives the result of access for the request from the remote logical volume access unit 616, it passes the result to an access request acquisition unit 614.

When the remote logical volume access unit 616 receives an access request from the local logical volume access unit 615, the remote logical volume access unit 616 refers to configuration information on remote logical volume in the configuration information storage unit for remote logical volume 613.

Subsequently the local logical volume access unit 615 identifies a disk node that manages data to be accessed and a slice number in a disk node to which the data is stored. Then the remote logical volume access unit 616 sends the access request designating the slice number to a disk node that manages data to be accessed. When the remote logical volume access unit 616 receives the result of access for the request from the disk node, it passes the result to the local logical volume access unit 615.

FIG. 9 is a diagram for an example of a data structure of a configuration information storage unit for local logical volume. A configuration information storage unit for local logical volume 612 stores the configuration information on local logical volume 612a. In FIG. 9, although only one volume 612a is stored, if a plurality of local logical volumes are created to which identifiers for different logical volumes are set, configuration information on a plurality of local logical volumes are stored.

The information 612a has columns of a local logical volume and a remote logical volume. In the column of a local logical volume, information indicating each of storage areas 31 and 32 set in the local logical volume 30 is registered. In the column of a remote logical volume, information on remote logical volumes that are made to correspond with each of virtual storage areas 31 and 32 of the local logical volume 30 is registered.

The column of local logical volume is further divided into columns of an identifier for logical volume, an initial address, and an end address. In the column of identifier for logical volume, an identifier for logical volume of local logical volume 30 to which virtual storage areas 31 and 32 are defined is set. In the column of initial address, the initial address (a block number of the initial block) in the local logical volume 30 of virtual storage area is set. In the column of end address, the end address (a block number of the end block) in the local logical volume 30 of the virtual storage area is set.

The column of remote logical volume is further divided into columns of an identifier for logical volume, an initial address, and an end address. In the column of identifiers for logical volume, identifiers for logical volumes of remote logical volumes 40 and 50, which are made to correspond to virtual storage areas 31 and 32, are set. In the column of initial address, the initial addresses (a block number of the initial block) in the remote logical volumes 40 and 50, which are made to correspond to virtual storage areas 31 and 32, are set. In the column of end address, the end addresses (a block number of the end block) in the remote logical volumes 40 and 50, which are made to correspond to virtual storage areas 31 and 32, are set.

FIG. 10 is a diagram for an example of a data structure of a configuration information storage unit for remote logical volume. A configuration information storage unit for remote logical volume 613 stores configuration information on remote logical volume 613a. The volume 613a is information obtained by extracting information only on allocation of primary slice from slice management information collected from each of disk nodes 100, 200, 300, and 400 by a control node 500.

The volume 613a has columns of disk node ID, slice ID, logical volume ID, and segment ID.

For the disk node ID column, an identifier for a disk node allocated to a primary slice is set. For the slice ID column, a slice number in a disk node to which a primary slice is allocated is set. For the logical volume ID column, an identifier for logical volume of remote logical volume to which the primary slice belongs is set. For the segment ID column, a segment ID indicating a segment in a remote logical volume to which a primary slice belongs is set.

A control node 500 distributes the configuration information on remote logical volume 613a to an access node 600. The control node 500 distributes the same configuration information on remote logical volume to an access node 700 as well. Then, setting the same configuration information on local logical volume 612a shown in FIG. 9 to the access node 700 enables building of a common access environment with the node 600 to disk nodes 100, 200, 300, and 400.

FIG. 11 is a pattern diagram for an access environment from access nodes to disk nodes. In access nodes 600 and 700, remote logical volumes are allocated to virtual storage areas indicated by addresses of local logical volumes. The remote logical volumes are managed in units of segments. Each segment includes a pair of a primary slice and a secondary slice, and slices in disk nodes 100 and 200 are allocated to the primary slice. This common allocation relationship of access nodes 600 and 700 enables the same data accesses either from access nodes 600 or 700. This means that data stored in disk nodes 100 and 200 are uniquely identified by specifying a logical volume identifier of local logical volume and a position of data in the local logical volume using a block number and a position in the block (e.g., an offset from the initial block and the data length).

When a system has been continuously operated under the above environment, the available space of a local logical volume eventually runs short. A simple solution may be extending a storage area of a local logical volume and a generating new remote logical volume, and then allocating the remote logical volume to the extended area of local logical volume. However, if such processes are repeated, managing the correspondence relationship between the local logical volume and remote logical volume is complicated; thereby the amount of data of configuration information on local logical volume is increased. Furthermore, when only a limited number of remote logical volumes can be allocated to local logical volumes, after allocating remote logical volumes up to the limit, extending the local logical volume is then difficult.

According to this embodiment, a remote logical volume which has the same storage capacity as the local logical volume with extended storage area is allocated to the local logical volume. This switching allocation from the local logical volume to the remote logical volume is performed without shutting down the system. Allocating the same slice of the same disk node as the remote logical volume allocated to the local logical volume before switching allocation to the newly created remote logical volume (redundant allocation) eliminates the need for copying data after switching the allocation.

Now, extension of storage capacity for the local logical volume is explained in detail. FIG. 12 is a sequence diagram for a first half of processes to extend storage capacity of a local logical volume. Processes shown in FIG. 12 are explained by referring to the operation numbers.

Operation S11

A free space monitoring unit 810 of a management node 800 displays on a monitor that free spaces of local logical volumes in access nodes 600 and 700 are running short. In response to an instruction to extend local logical volume input by an administrator who confirmed the display on the monitor, a reconfiguration instruction unit 820 sends a request to allocate a remote logical volume with a logical volume identifier "LVOL3" to a control node 500. This allocation request includes information indicating that the remote logical volume with a logical volume identifier "LVOL3" combines two remote logical volumes with logical volume identifiers "LVOL1" and "LVOL2", and extends the storage capacity. More specifically the allocation request includes designation of segments to which redundant allocation are performed (designation that redundant allocation should be performed for two remote logical volumes with logical volume identifiers "LVOL1" and "LVOL2") and segments to which slice is allocated uniquely (the segment for the amount of the extended area).

Operation S12

A logical volume management unit 510 of the control node 500 that received the allocation request defines a new remote logical volume with a logical volume identifier "LVOL3" to slice management information in a slice management information group storage unit 520. Then, the logical volume management unit 510 allocates slices in disk nodes 100, 200, 300, and 400 to primary and secondary slices of segments comprising the newly defined remote logical volume. The details of the processes are explained later (refer to FIG. 22).

Operation S13

The logical volume management unit 510 sends a request to change slice management information to the disk node 100.

Operation S14

Similarly the logical volume management unit 510 sends a request to change slice management information to the disk node 200.

The request to change slice management information includes slices to be allocated to primary and secondary slices of each segment comprising a remote logical volume with a logical volume identifier "LVOL3".

Operation S15

A data management unit 140 of a disk node 100 changes slice management information (metadata and redundant allocation table) stored in a slice management information storage unit 150. The details of the processes are explained later (refer to FIG. 23).

Operation S16

Similarly a data management unit 240 of disk node 200 changes slice management information (metadata and redundant allocation table) stored in a slice management information storage unit 250.

When slice management information is updated, information on slices to be allocated to an extended area of a remote logical volume with a logical volume identifier "LVOL3" is registered to the metadata. Information on redundant allocation of slices that have been allocated to remote logical volumes with logical volume identifiers "LVOL1" and "LVOL2" to a remote logical volume with the logical volume identifier "LVOL3" is registered to a redundant allocation table.

Operation S17

Upon completion of updating slice management information, the data management unit 140 sends the notification of completion of change to the control node 500.

Operation S18

Upon completion of updating slice management information, the data management unit 240 of the disk node 200 sends the notification of completion of change to the control node 500.

The notification of completion of change sent from each of disk nodes 100 and 200 includes information on slice management information after the update.

Operation S19

Upon receiving the notification of completion of change from each of the disk nodes 100 and 200, the logical volume management unit 510 of the control node 500 sends a notification of allocation completion to the management node 800.

Operation S20

Upon receiving the notification of completion of allocation from the control node 500, the reconfiguration instruction unit 820 of the management node 800 sends a request to connect to a remote logical volume with a logical volume identifier "LVOL3" to the access node 600.

Operation S21

Upon receiving the connect request, a configuration management unit for logical volume 611 of the access node 600 sends a request for configuration information on remote logical volume to the control node 500.

Operation S22

The logical volume management unit 510 of the control node 500 responds to a request for configuration information on remote logical volume with a logical volume identifier "LVOL3". The details of the processes are explained later (refer to FIG. 24).

Operation S23

The logical volume management unit 510 sends the generated configuration information on remote logical volume to the access node 600.

Operation S24

The configuration management unit for logical volume 611 of the access node 600 additionally registers configuration information on a remote logical volume with a logical volume identifier "LVOL3" in a configuration information storage unit for remote logical volume 613 based on the received configuration information on remote logical volume. Then, the configuration management unit for logical volume 611 sends a notification of connect completion to the management node 800.

Operation S25

The reconfiguration instruction unit 820 of the management node 800 sends a request to change a configuration of local logical volume to the access node 600. The configuration change request includes information that the remote local volume with the identifier "LVOL3" is generated and information about the storage capacity of the remote logical volume.

Operation S26 In response to a request to change configuration, the configuration management unit for logical volume 611 of the access node 600 updates configuration information on local logical volume 612a in the configuration information storage unit for local logical volume 612. The details of the processes are explained later (refer to FIG. 25).

Operation S27

The configuration management unit for logical volume 611 sends a notification of configuration change completion for the local logical volume to the management node 800.

In this manner, the local volume of the access node 600 is extended. At this time, slices of the disk nodes allocated to remote logical volumes with logical volume identifiers "LVOL1" and "LVOL2" are redundantly allocated to a remote logical volume with a logical volume identifier "LVOL3".

Storage capacity for the extended area of local logical volume with a logical volume identifier "LVOLX" shall be considered equivalent to two segments in a remote logical volume. For the segments corresponding to the extended area in the newly created remote logical volume with a logical volume identifier "LVOL3", a free slice of the disk node 100 shall be allocated to the primary slice, while that of the disk node 200 shall be allocated to the secondary slice.

FIG. 13 is a pattern diagram for an access environment from access nodes to disk nodes at redundant allocation. FIG. 13 is that the storage area of local logical volume is extended in an access node 600, while that in the access node 700 has not been extended.

As shown in FIG. 13, the storage area of the local logical volume is extended in the access node 600. In the extended storage area, the initial address is "L-a5" and the end address is "L-a6" respectively. The remote logical volume is replaced with a remote logical volume with a logical volume identifier "LVOL3". The remote logical volume with the identifier "LVOL3" has the same storage capacity as the local logical volume with a logical volume identifier "LVOLX".

Storage areas with addresses from "L-a1" to "L-a6" of a local logical volume with a logical volume identifier "LVOLX" correspond to storage areas with addresses from "R3-a1" to "R3-a6" of a remote logical volume with a logical volume identifier "LVOL3". The extended area of local logical volume with a logical volume identifier "LVOLX" is a storage area with addresses from "L-a1" to "L-a6". This storage area corresponds to storage areas with addresses from "R3-a5" to "R3-a6" of a remote logical volume with a logical volume identifier "LVOL3".

Two slices of the disk node 100 are allocated to primary slices of two segments corresponding to storage areas with addresses from "R3-a1" to "R3-a6" of remote logical volume with a logical volume identifier "LVOL3". These two slices of the disk node 100 are redundantly allocated to remote logical volumes with logical volume identifiers "LVOL1" and "LVOL3".

Two slices of the disk node 200 are allocated to primary slices of two segments corresponding to storage areas with addresses from "R3-a3" to "R3-a4" of remote logical volume with a logical volume identifier "LVOL3". These two slices of the disk node 200 are redundantly allocated to remote logical volumes with logical volume identifiers "LVOL2" and "LVOL3".

Two slices of the disk node 100 are allocated to primary slices of two segments corresponding to storage areas with addresses from "R3-a5" to "R3-a6" of remote logical volume with a logical volume identifier "LVOL3". These two slices of the disk node 100 are allocated only to a remote logical volume with a logical volume identifier "LVOL3".

The disk node 100 sets up the slice management information so that slices are allocated to the newly created remote logical volume and slices are allocated redundantly.

FIG. 14 is a diagram for slice management information after redundant allocation is applied. Compared to slice management information before redundant allocation is applied as shown in FIG. 7, information on the following two slices is added to a metadata 151 in a slice management information storage unit 150.

The information indicates that a slice with a slice ID "21" is allocated to a segment with a segment ID "5" of a remote logical volume with a logical volume identifier "LVOL3" as a primary slice. Moreover, this slice pairs a segment with a slice ID "21" of the disk node 200 with a node identifier "SN-B".

A slice with a slice ID "22" is allocated to a segment with a segment ID "6" of a remote logical volume with a logical volume identifier "LVOL3" as a primary slice. Moreover, this slice pairs a segment with a slice ID "22" of the disk node 200 with a node identifier "SN-B".

Compared to slice management information before redundant allocation is applied as shown in FIG. 7, information on the following two slices is added to a redundant allocation table 152 in a slice management information storage unit 150.

A slice with a slice ID "1" is redundantly allocated to a segment ID "1" of a remote logical volume with a logical volume identifier "LVOL3". A slice with a slice ID "2" is redundantly allocated to a segment ID "2" of a remote logical volume with a logical volume identifier "LVOL3". A slice with a slice ID "11" is redundantly allocated to a segment ID "3" of a remote logical volume with a logical volume identifier "LVOL3". A slice with a slice ID "12" is redundantly allocated to a segment ID "4" of a remote logical volume with a logical volume identifier "LVOL3". The redundantly allocated slice in the disk node 100 is allocated as a primary slice when a flag in the metadata 151 is a primary. Likewise, the redundantly allocated slice in the disk node 100 is allocated as a secondary slice when a flag in metadata 151 is a secondary.

The configuration information on a local logical volume is updated at the access node 600 where a storage area has been extended.

FIG. 15 is a diagram for configuration information on a local logical volume after extending a storage area. Compared to FIG. 9, the configuration information on local logical volume 612a in the configuration information storage unit for local logical volume 612a in FIG. 15 was changed as follows. Remote logical volumes allocated to local logical volumes with logical volume identifier "LVOLX" have been changed from two remote logical volumes of "LVOL1" and "LVOL2" to one remote logical volume with the identifier "LVOL3". Moreover, in FIG. 15, as a result of extending the storage area of local logical volume with the identifier "LVOLX", the end address of the local logical volume with the identifier "LVOLX" is changed to "L-a6".

FIG. 16 is a diagram for configuration information on a remote logical volume after extending a storage area. Compared to FIG. 10, the configuration information on remote logical volume 613a of a configuration information storage unit for remote logical volume 613 has been changed as follows in FIG. 16. That is, slice IDs "1" and "2" of a disk node "SN-A" and slice IDs "1" and "2" of a disk node "SN-B" are redundantly allocated to the newly created remote logical volume with a logical volume identifier "LVOL3". Furthermore, slice IDs "11" and "12" of the disk node "SN-A" are allocated to a remote logical volume with a logical volume identifier "LVOL3".

Thus, extension of the storage area of a local logical volume in the access node 600 is completed. The control node 500 also instructs other disk node 700 to switch to the new remote logical volume with a logical volume identifier "LVOL3". Upon completion of switching to the remote logical volume in all of access nodes 600 and 700, the control node 500 deletes the definition of the remote logical volumes with logical volume identifiers "LVOL1" and "LVOL2" that were previously used.

Now, processes from extending a local logical volume of access node 700 to deleting a remote logical volume that will not be used anymore are explained.

Figure 17:
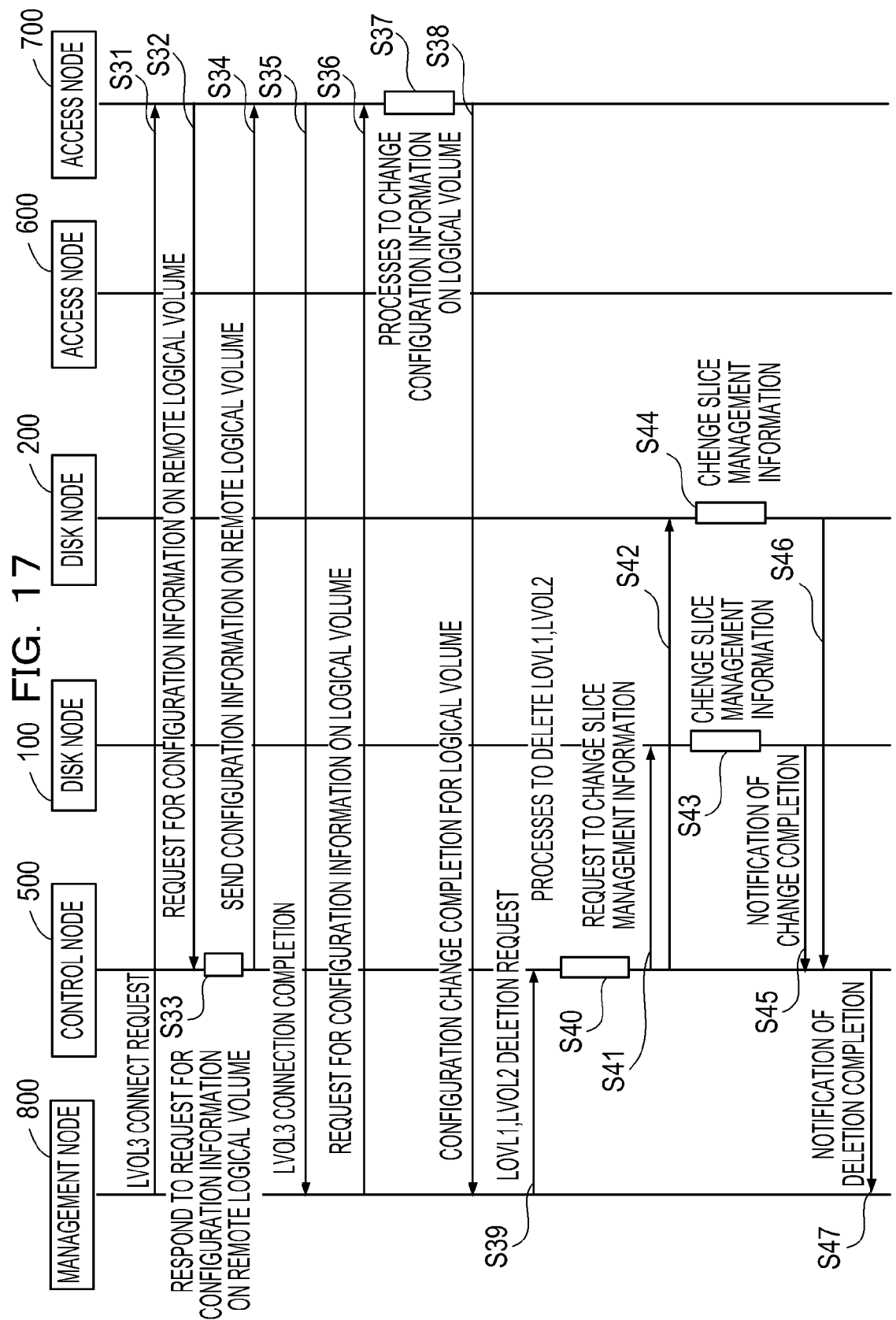
FIG. 17 is a sequence diagram for a latter half of processes to extend a storage capacity of a local logical volume.

FIG. 17 is a sequence diagram for a latter half of processes to extend storage capacity of a local logical volume. Processes shown in FIG. 17 are explained by referring to the operation numbers.

Operation S31

Subsequent to the processes in FIG. 12, a reconfiguration instruction unit 820 of a management node 800 sends a request to connect to a remote logical volume with a logical volume identifier "LVOL3" to an access node 700.

Operation S32

Upon receiving the connect request, the access node 700 sends a request for configuration information on the remote logical volume to a control node 500.

Operation S33

A logical volume management unit 510 of the control node 500 responds to the request for configuration information on the remote logical volume.

Operation S34

The logical volume management unit 510 sends the generated configuration information on the remote logical volume to the access node 700.

Operation S35

The access node 700 updates the configuration information on the remote logical volume based on the received configuration information on the remote logical volume. Then, the access node 700 sends a notification of connect completion to the management node 800.

Operation S36

The reconfiguration instruction unit 820 of the management node 800 sends a request to change a configuration of the local logical volume to the access node 700.

Operation S37

In response to a request to change configuration, the access node 700 updates configuration information on the local logical volume.

Operation S38

The access node 700 sends a notification of configuration change completion for the local logical volume to the management node 800.

Operation S39

After confirming the completion of extending the local logical volumes in all of the access nodes 600 and 700, the reconfiguration instruction unit 820 of the management node 800 sends a request to delete remote logical volumes with logical volume identifiers "LVOL1" and "LVOL2" to the control node 500.

Operation S40

The logical volume management unit 510 of the control node 500 deletes remote logical volumes with logical volume identifiers "LVOL1" and "LVOL2". More specifically the logical volume management unit 510 extracts information on remote logical volumes with logical volume identifiers "LVOL1" and "LVOL2" stored in a slice management information group storage unit 520, and determines disk nodes to which slices for remote logical volumes with logical volume identifiers "LVOL1" and "LVOL2" are allocated. Then, the logical volume management unit 510 updates the slice management information in the slice management information group storage unit 520. The details of the processes will be explained later (refer to FIG. 26).

Operation S41

The logical volume management unit 510 sends a request to change slice management information to the disk node 100. This change request includes information on remote logical volumes with logical volume identifiers "LVOL1" and "LVOL2" to be deleted.

Operation S42

The logical volume management unit 510 sends a request to change slice management information to the disk node 200 as well.

Operation S43

A data management unit 140 of a disk node 100 changes the slice management information. More specifically the data management unit 140 deletes information on allocation relationship of slices that are allocated to remote logical volumes with logical volume identifiers "LVOL1" and "LVOL2". At this time, when redundant allocations are set to slices from which the information on allocation relationship are deleted in the redundant allocation table 152, the data management unit 140 reflects to the metadata 151 that the destination of the redundant allocations have been changed to a normal allocation destination. In other words, the data management unit 140 sets a logical volume identifier "LVOL3" as a new allocation destination for slices to which "LVOL1" and "LVOL2" have been allocated as logical volumes of allocation destination. Then the data management unit 140 deletes information on the redundant allocation that is reflected to the metadata 151 from the redundant allocation table 152.

Operation S44

As in the disk node 100, the disk node 200 changes slice management information.

Operation S45

Upon completion of changing the slice management information, the data management unit 140 of a disk node 100 sends a notification of change completion to the control node 500.

Operation S46

Upon completion of changing the slice management information, the disk node 200 sends a notification of change completion to the control node 500 as well. The notification of completion of change sent from each of disk nodes 100 and 200 includes information on slice management information after the update.

Operation S47

Upon receiving the notification of completion of change from each of disk nodes 100 and 200, the logical volume management unit 510 of the control node 500 sends a notification of completion of deletion to the management node 800. As explained above, remote logical volumes for which allocations to local logical volumes have been cancelled are deleted in all of the access nodes 600 and 700. When redundant allocation exists in slices in the disk node which is allocated to the deleted remote logical volume, the redundantly allocated remote logical volume remains.

Figure 18:
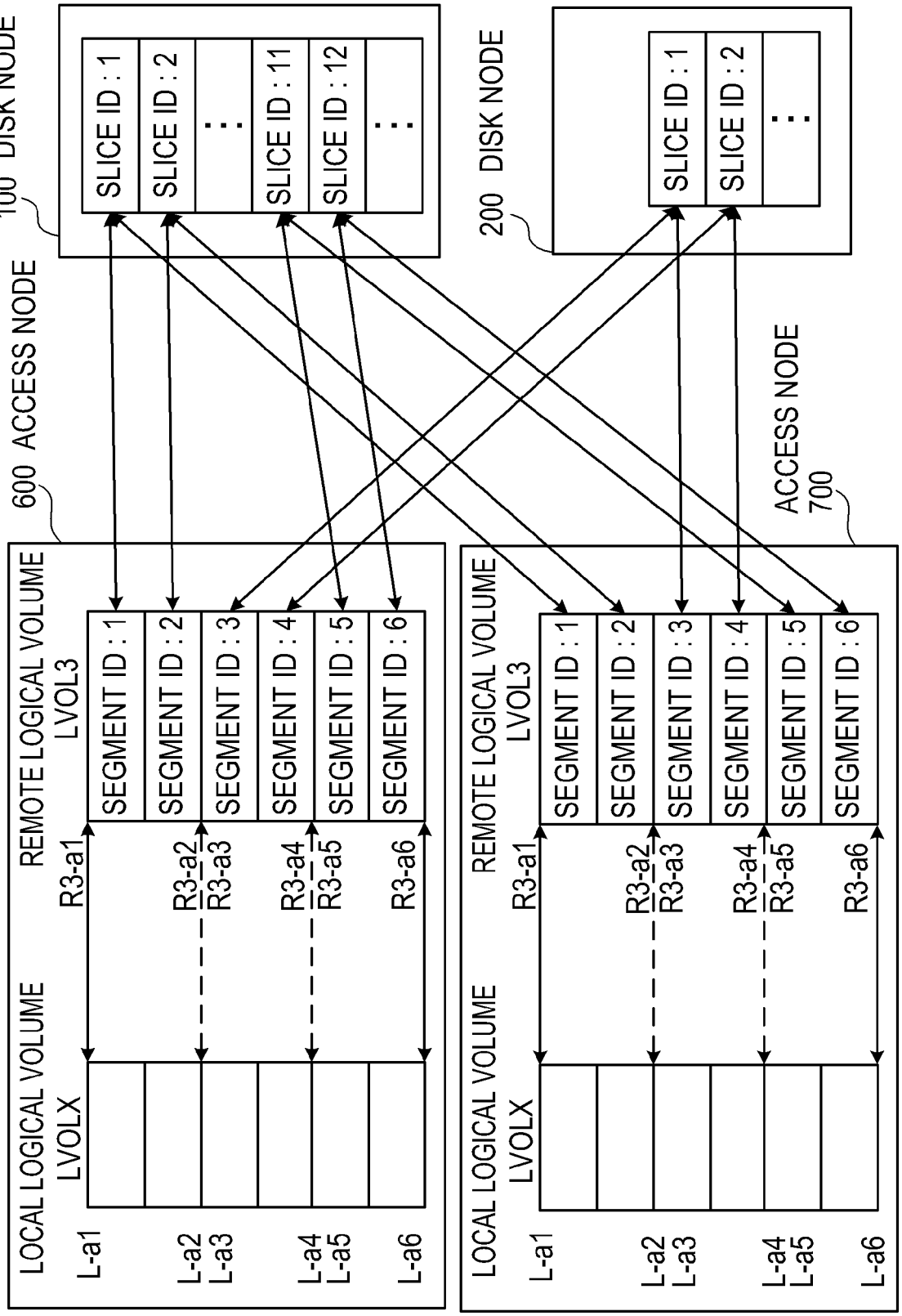
FIG. 18 is a pattern diagram for an access environment from access nodes to disk nodes after extending storage capacity.

FIG. 18 is a pattern diagram for an access environment from access nodes to disk nodes after extending storage capacity. As shown in FIG. 18, redundant allocation of disk nodes 100 and 200 are cancelled upon completion of extending a storage capacity of local logical volumes in access nodes 600 and 700. This means each slice of disk nodes 100 and 200 are allocated only to one segment of one remote logical volume (e.g., "LVOL3" in FIG. 18).

FIG. 19 is a diagram for slice management information after cancelling redundant allocation. The metadata 151 stored in a slice management information storage unit 150, compared to when redundant allocation is applied (refer to FIG. 14), in FIG. 19, logical volume identifiers indicating remote logical volumes to which slices with slice ID "1", "2", "11", and "12" are allocated are changed to "LVOL3". In the redundant allocation table 152, the registered information for redundant allocation (refer to FIG. 14) is deleted.

FIG. 20 is a diagram for configuration information on a remote logical volume after cancelling redundant allocation. Compared to FIG. 16, information on the remote logical volume with logical volume identifiers "LVOL1" and "LVOL2" is deleted in the configuration information on remote logical volume 613a of a configuration information storage unit for remote logical volume 613.

Figure 21:
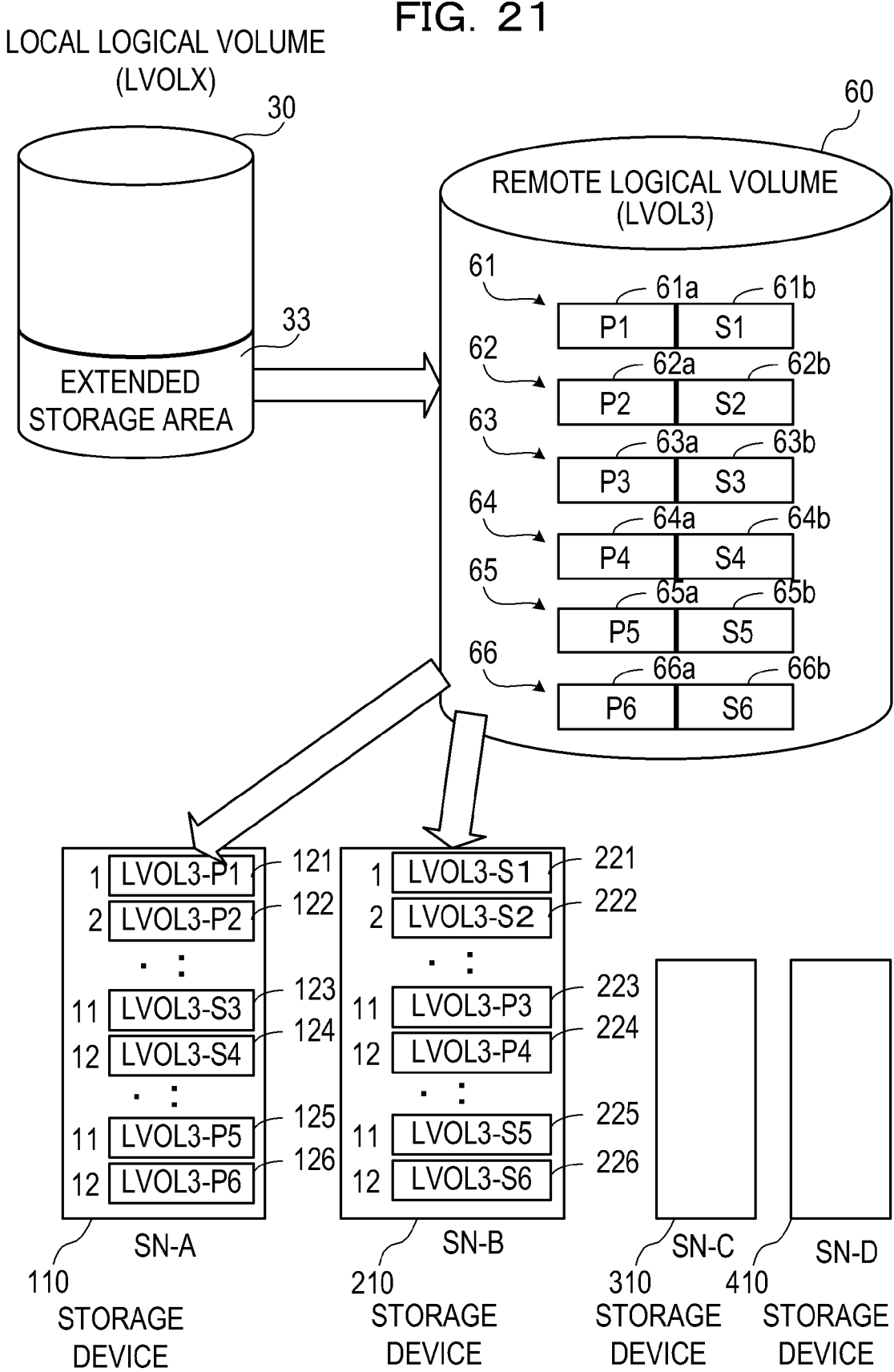
FIG. 21 is a diagram for data structure of a logical volume after extending a storage area.

FIG. 21 is a diagram for the data structure of a logical volume after extending a storage area. An extended storage area 33 is added to a local logical volume 30. A newly created remote logical volume 60 includes six segments from 61 to 66. Slices of 121, 122, 125, and 126 in a storage device 100 managed by the disk node 100 are allocated to primary slices of the segments 61, 62, 65, and 66 respectively. Slices of 223 and 224 in a storage device 210 managed by the disk node 200 are allocated to primary slices of 63a and 64a of segments 63 and 64 respectively. Slices of 221, 222, 225, and 226 in a storage device 210 managed by the disk node 200 are allocated to secondary slices 61b, 62b, 65b, and 66b of segments 61, 62, 65 and 66 respectively. Slices of 123 and 124 in a storage device 110 managed by the disk node 100 are allocated to secondary slices 63b and 64b of segments 63 and 64 respectively. Now major processes executed by each node will be explained in detail. First, processes to allocate a remote logical volume with a logical volume identifier "LVOL3" by a control node 500 is explained (Operation S12 of FIG. 12).

Figure 22:
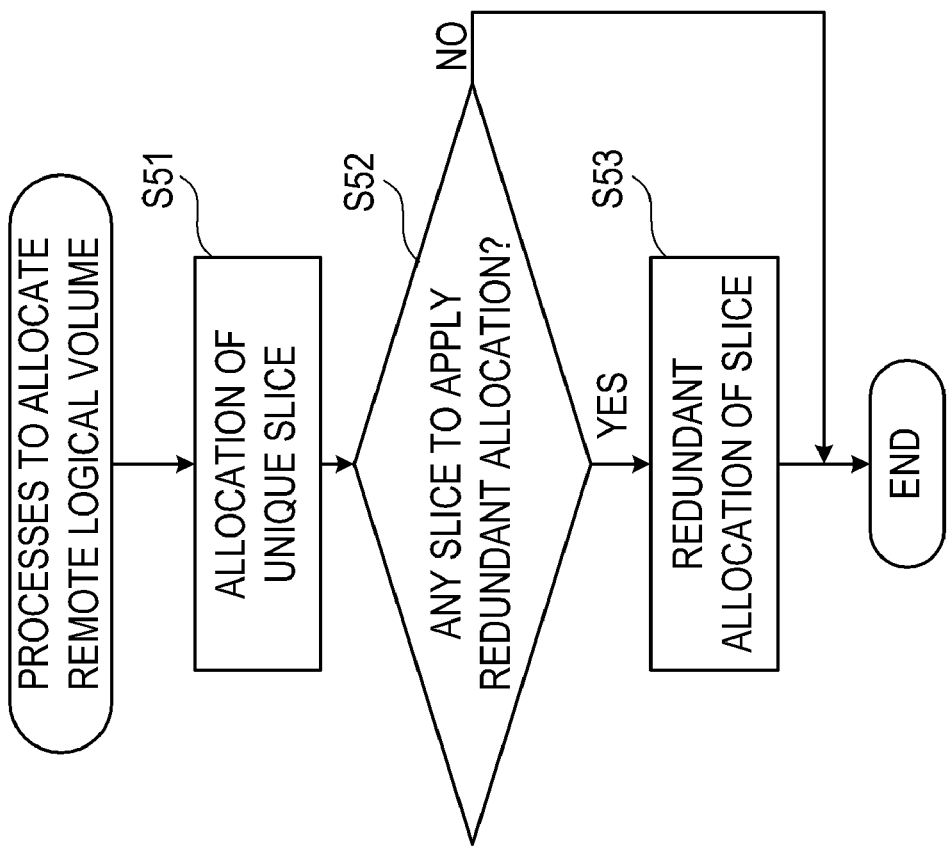
FIG. 22 is a flowchart for processes to allocate a remote logical volume.

FIG. 22 is a flowchart for processes to allocate a remote logical volume. Processes shown in FIG. 22 are explained by referring to the operation numbers.

Operation S51

When a logical volume management unit 510 of the control node 500 receives a request to allocate a remote logical volume from the management node 800, the logical volume management unit 510 defines a new remote logical volume. This allocation request includes designations of a segment to be redundantly allocated to another remote volume and of a segment to which a slice is uniquely allocated (a slice which is not redundantly allocated to any remote logical volume). The logical volume management unit 510 allocates free slices in disk nodes 100, 200, 300, and 400 (slices not allocated to any remote volume) to a primary slice and a secondary slice of a segment to which a unique slice should be allocated. At this time, slices of different disk nodes are allocated to a primary slice and a secondary slice in the same segment.

Operation S52

The logical volume management unit 510 determines whether or any designation of slices to which redundant allocation has been applied exists in the allocation request. If there is any slice to which redundant allocation is designated, the process proceeds to Operation 553. If there is no slice to which redundant allocation is designated, then the process to allocate a remote logical volume is completed.

Operation S53

The logical volume management unit 510 performs redundant allocation of a slice. More specifically the logical volume management unit 510 allocates slices of disk nodes 100 and 200 which are allocated to remote logical volumes with logical volume identifiers "LVOL1" and "LVOL2" to remote logical volumes with logical volume identifiers "LVOL3" as well.

Now, processes to change slice management information performed at the disk node 100 is explained (Operation S15 in FIG. 12).

Figure 23:
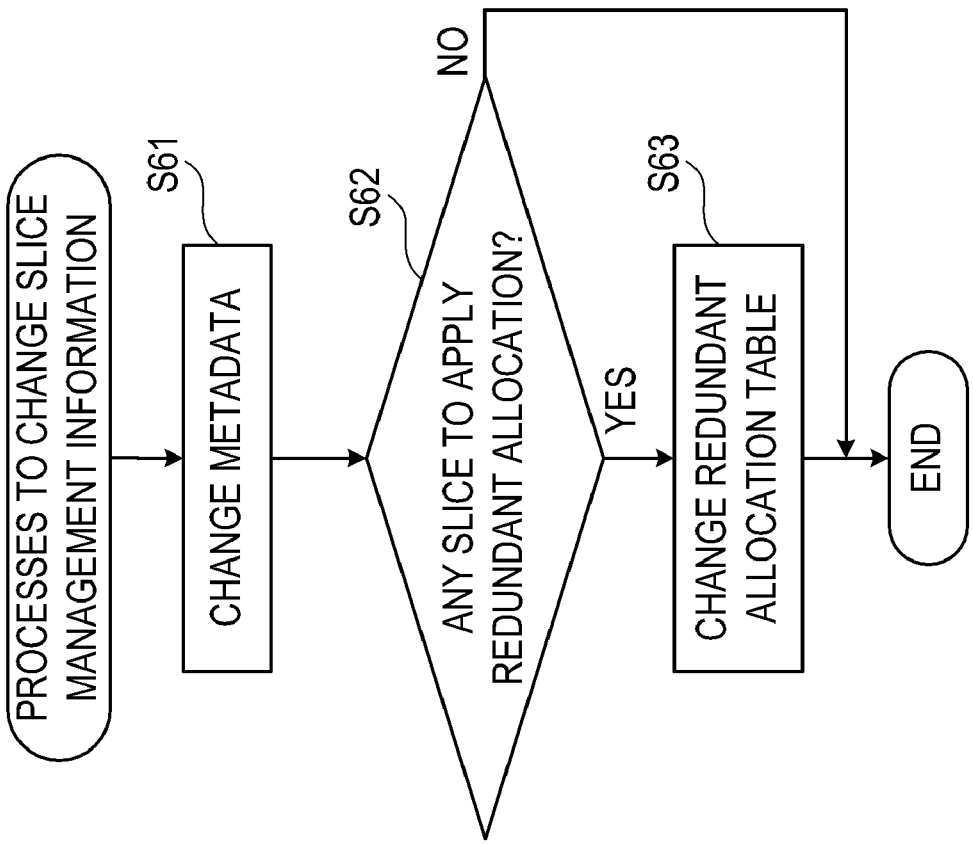
FIG. 23 is a flowchart for processes to change slice management information.

FIG. 23 is a flowchart for processes to change slice management information. Processes shown in FIG. 23 are explained by referring to the operation numbers.

Operation S61

When a data management unit 140 of a disk node 100 receives a request to change slice management information from a control node 500, is additionally registers the allocation information on unique slice information in the metadata 151 within a slice management information storage unit 150.

Operation S62

The data management unit 140 determines whether any information on a slice to which redundant allocation is to be applied exists in the change request. If there is a slice to be redundantly allocated, the process proceeds to Operation S63. If there is no slice to which redundant allocation is to be applied, then the process to change slice management information is completed.

Operation S63

The data management unit 140 additionally registers information on a slice to which redundant allocation is to be applied to a redundant allocation table in the slice management information storage unit 150.

In this manner, the slice management information is changed at the disk node 100. Now, processes performed by the control node 500 to respond to a request for configuration information on a remote logical volume are explained in detail.

Figure 24:
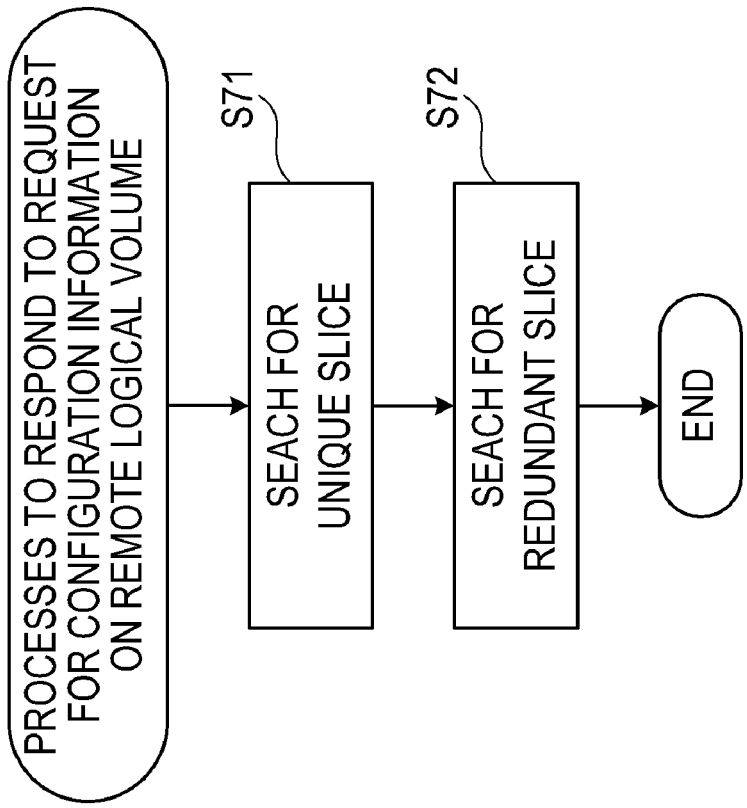
FIG. 24 is a flowchart for processes to respond to a request for configuration information for remote logical volume.

FIG. 24 is a flowchart for processes to respond to a request for configuration information for a remote logical volume. Now, processes shown in FIG. 24 are explained by referring to the operation numbers.

Operation S71

A logical volume management unit 510 of control node 500 searches for a unique slice. More specifically the logical volume management unit 510 searches metadata of each slice management information in a slice management information group storage unit 520 for information on a primary slice (information with P in a column of flag, and LVOL3 in a column of logical volume ID are set) that is set as an allocation destination of a remote logical volume to be added with a logical volume identifier "LVOL3".

Operation S72

The logical volume management unit 510 searches for redundant slices. More specifically the logical volume management unit 510 searches a redundant allocation table of each slice management information in a slice management information group storage unit 520 for information on a primary slice (information with "LVOL3" is set in a column of logical volume ID) that is set as an allocation destination of a remote logical volume to be added with logical volume identifier "LVOL3".

The information searched at Operation S71 and Operation S72 includes configuration information for remote logical volumes with logical volume identifier "LVOL3".

Now, processes in the control node 600 to change configuration information on a local logical volume are explained in detail (Operation S26 in FIG. 12).

Figure 25:
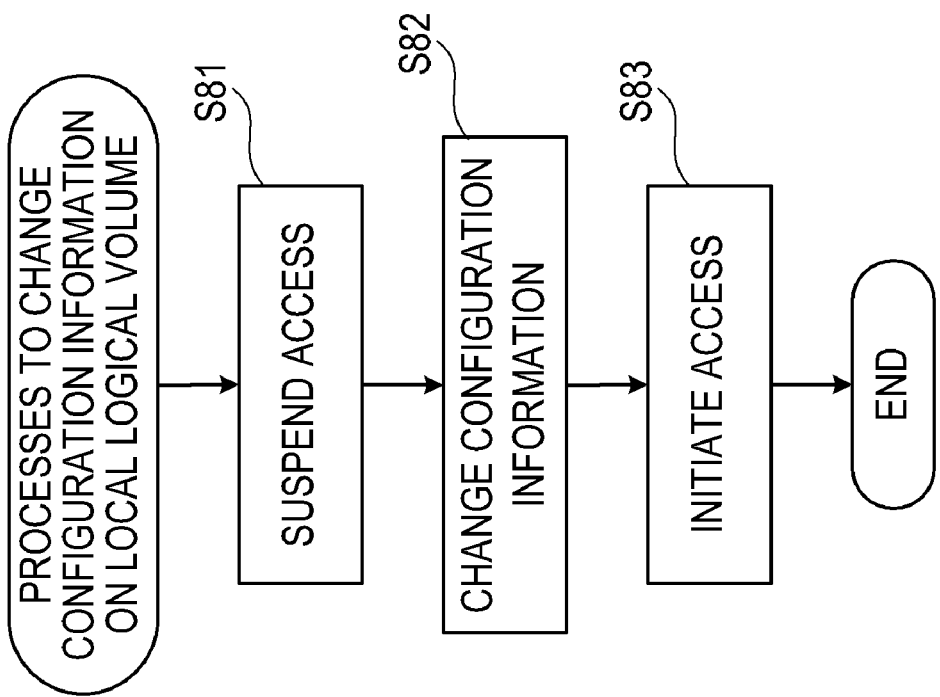
FIG. 25 is a flowchart for processes to change the configuration for local logical volumes.

FIG. 25 is a flowchart for processes to change the configuration for local logical volumes. Processes shown in FIG. 25 are explained by referring to the operation numbers.

Operation S81

A configuration management unit for logical volume 611 of the access node 600 suspends access from terminal devices 21 to 23 to a local logical volume with a logical volume identifier "LVOLX". More specifically the configuration management unit for logical volume 611 instructs a local logical volume access unit 615 to suspend access to a local logical volume with a logical volume identifier "LVOLX". Then, the local logical volume access unit 615 suspends processing of an access request even if an access request to local logical volume with a logical volume identifier "LVOLX" is input, until access to a local logical volume with a logical volume identifier "LVOLX" is initiated.

Operation S82

The configuration management unit for logical volume 611 changes the configuration information on local logical volumes. More specifically, the configuration management unit for logical volume 611 allocates remote logical volumes with logical volume identifier "LVOL3" to all of the storage areas of local logical volumes with logical volume identifiers "LVOLX" in configuration information on local logical volume 612a of the configuration information storage unit for local logical volume 612.

Operation S83

The configuration management unit for logical volume 611 initiates access from terminal devices 21 to 23 to a local logical volume with a logical volume identifier "LVOLX". More specifically the configuration management unit for logical volume 611 instructs a local logical volume access unit 615 to initiate access to the local logical volume with logical volume identifier "LVOLX". Then, the local logical volume access unit 615 initiates processing of an access request to a local logical volume with a logical volume identifier "LVOLX".

In this manner, the access node 600 changes the configuration on the local logical volume.

Now, processes to delete remote logical volume are explained in detail (Operation S40 of FIG. 17).

Figure 26:
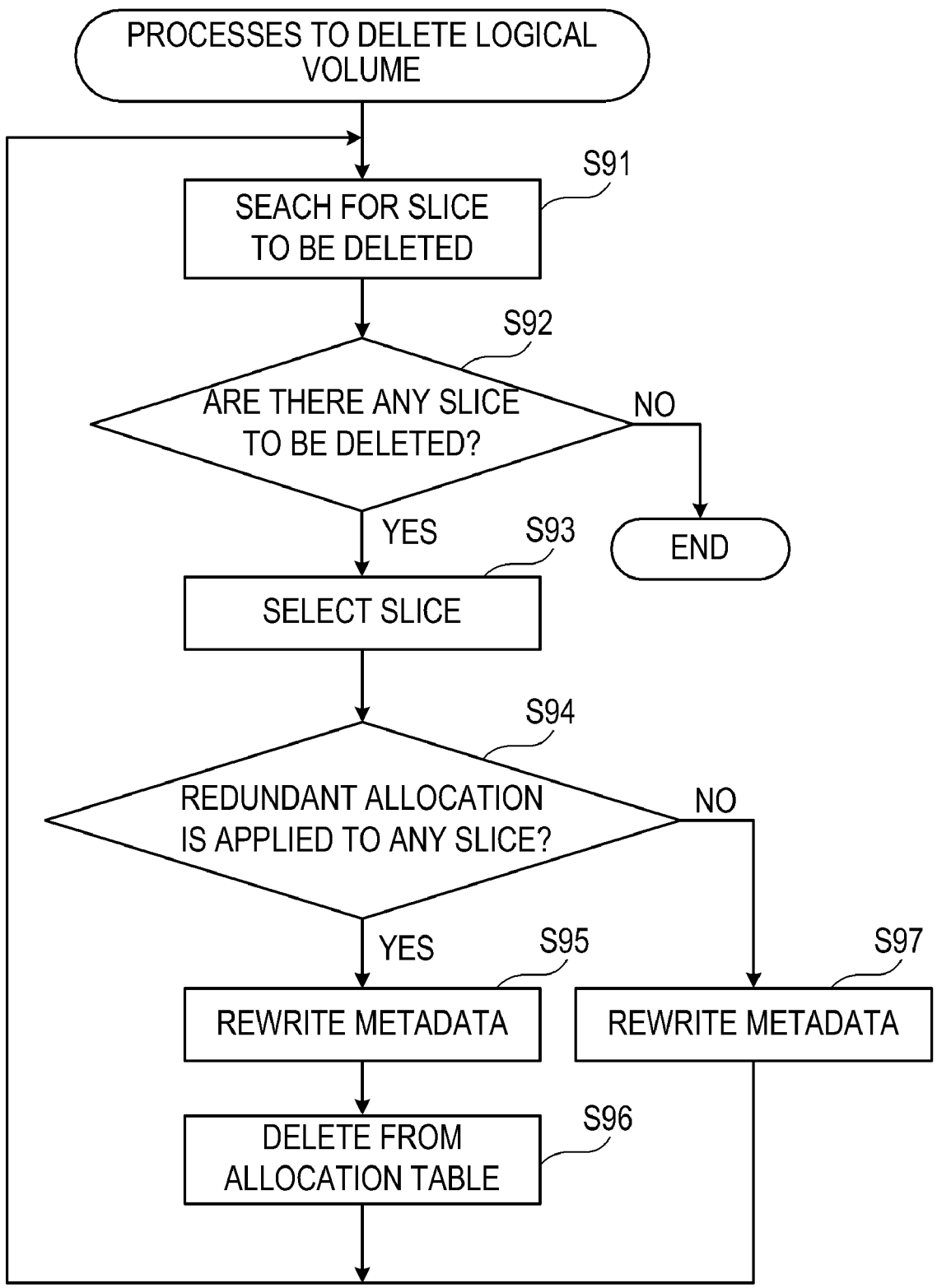
FIG. 26 is a flowchart for processes to delete a remote logical volume.

FIG. 26 is a flowchart for processes to delete a remote logical volume. Processes shown in FIG. 26 are explained by referring to the operation numbers.

Operation S91

A logical volume management unit 510 of the control node 500 searches metadata of slice management information in slice management information group storage unit 520, for slices to be deleted. More specifically the logical volume management unit 510 searches for information on slices to be deleted "LVOL1" and "LVOL2" are set in the column of logical volume ID.

Operation S92

The logical volume management unit 510 determines whether any slice to be deleted exists. If there is any slice to be deleted, the process proceeds to Operation S93. If there is no slice to be deleted, the process ceases.

Operation S93

The logical volume management unit 510 selects one slice to be deleted (a slice is uniquely identified by a disk node ID and slice ID) from metadata in the slice management information group storage unit 520.

Operation S94

The logical volume management unit 510 determines whether redundant allocation is applied to the selected slice or not.

Operation S95

The logical volume management unit 510 rewrites the metadata. More specifically the logical volume management unit 510 overwrites the columns of logical volume ID and segment ID for the selected slice in the metadata with information registered in the columns of logical volume ID and segment ID that correspond to the selected slice in a redundant management table.

Operation S96

The logical volume management unit 510 deletes information on the selected slice from the redundant allocation table. After that, the process proceeds to Operation S91.

Operation S97

The logical volume management unit 510 rewrites metadata. More specifically the logical volume management unit 510 deletes information registered in the columns of logical volume ID, segment ID, paired disk node ID, and paired slice ID that corresponds to the selected slice from the metadata to which the selected slice is registered. After that, the process proceeds to Operation S91. As explained above, the access nodes 600 and 700 allocate remote logical volumes to local logical volumes and then allocate a storage area (slice) provided by a disk node to the remote logical volume. Thereby flexibility in extending a storage area of local logical volume increases. This means that even if an excessive number of volumes are allocated to a local logical volume, the volumes can be easily stored in one remote logical volume. This allows extending local logical volumes continuously without shutting down the system operation.

Moreover, a remote logical volume is managed in units of segments and has a primary slice and a secondary slice. The same data is guaranteed to be stored in the primary slice and the secondary slice by cooperative operations among disk nodes 100, 200, 300, and 400. Therefore, losing data in the event of disk node failure can be prevented and the data is recovered immediately as well.

Furthermore, the redundant configuration using a primary slice and a secondary slice allows easy maintenance of disk nodes 100, 200, 300, and 400 and data reallocation. For instance, a case may be considered in which a disk node having a large capacity is introduced because of insufficient storage capacity of storage device 110 connected to a disk node 100. At this time, the newly introduced disk node is connected to a network 10. Then the data managed by the disk node 100 may be copied to a storage device owned by the newly introduced disk node. The data can be copied from the secondary slice of the segment where the data managed by the disk node 100 is located. The secondary slices are distributed to either one of a plurality of disk nodes 100, 200, 300, and 400. This can prevent concentration of processing load to the disk node 100 even when creating a copy of data managed by the disk node 100. Moreover, processing of reading data from the access nodes 600 and 700 are performed only for primary slices. Thus, deterioration of access efficiency from access nodes 600 and 700 can be minimized when the data is copied from the secondary slice.

In the above example, remote logical volumes with logical volume identifier "LVOL1" and "LVOL2" are deleted immediately after completion of storage area extension of the local logical volume with the logical volume identifier "LVOLX". This process is performed under the assumption that remote logical volumes with logical volume identifiers "LVOL1" and "LVOL2" are only accessed via the local logical volume with the identifier "LVOLX". However, depending on operation, remote logical volumes with logical volume identifiers "LVOL1" and "LVOL2" can be directly accessed (without passing the local logical volume). In such case, without deleting the remote logical volumes with logical volume identifiers "LVOL1" and "LVOL2", such volumes can be used together with remote logical volume LVOL3. In the above embodiment, disk nodes 100, 200, 300, and 400, control node 500, access nodes 600 and 700, and control node 800 are individual devices; any multiple functions of the devices can be incorporated into one device. For example, functions of the control node 500 and the management node 800 can be incorporated into the access node 600.

For the convenience of explanation, in the above example, only slices of storage devices 110 and 120 managed by the disk nodes 100 and 200 are allocated to the remote logical volume. Slices of storage devices 310 and 320 managed by disk nodes 300 and 400 may be allocated as well.

The above functions can be achieved by a computer. In this case, a program directs the functions of disk nodes 100, 200, 300, and 400, access nodes 600 and 700, and a management node 800. The above processing functions can be achieved on a computer by executing the program. The program for the processes can be stored on a computer-readable medium. The computer-readable storage medium includes a magnetic recording apparatus, an optical disc, a magneto-optical disc, and/or a semiconductor memory. Examples of the magnetic recording apparatus include a hard disc device (HDD), a flexible disc (FD), and a magnetic tape (MT). Examples of the optical disc include a digital versatile disc (DVD), a DVD-RAM, a compact disc ROM (CD-ROM), and a CD-R (Recordable)/RW. An example of a magneto-optical disc includes a Magneto-Optical disc.

To market the program, a portable recording medium such as a DVD and a CD-ROM on which the program is recorded may be sold. Alternatively such program may be stored in a server computer and transferred from the server to other computers over a network.

A computer executing the above program stores the program recorded on a portable recording medium, or transferred from the server computer to its own storage device. Then the computer can read the program from its own storage device and execute processing accordingly. Alternatively the computer can read the program directly from a portable recording medium, or the computer can execute processing according to the program every time such program is transferred from the server computer.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A computer-readable storage medium storing a logical volume management program that causes a computer to execute processes to allocate a storage area to a logical volume, and to function as units comprising:
    a first storage unit that stores configuration information on a first stage logical volume to which a correspondence relationship of storage areas between a first stage logical volume and at least one second stage logical volume is registered;
    a second storage unit that stores configuration information on said second stage logical volume to which correspondence relationship of storage areas between said second stage logical volume and at least one storage device is registered;
    an access unit that refers to said configuration information on said first stage logical volume in response to an access request designating a storage area in said first logical volume, and determines a storage area in said second stage logical volume that corresponds to the storage area in said first logical volume designated by the access request, refers to said configuration information on said second stage logical volume and accesses a storage area in said storage device that corresponds to the determined storage area in the second stage logical volume;
    a logical volume generation unit that (a) generates, in response to a request to extend the designated amount of a storage area of said first stage logical volume, a new second stage logical volume to which the following are allocated; (i) a storage area in said storage device allocated to said second stage logical volume and (ii) a storage area in said storage device equivalent to a difference between the storage capacity designated by said storage area extension request and the storage capacity of said first stage logical volume before extension, and then (b) registers the correspondence relationship of storage areas between said new second stage logical volume and said storage device to said configuration information on said second stage logical volume, and
    a storage area extension unit that extends the storage area of said first stage logical volume stored in said configuration information on said first stage logical volume to the storage capacity designated by said storage area extension request, and makes said new second stage logical volume generated by said logical volume generation unit correspond to said first stage logical volume with extended storage area.

2. A computer-readable storage medium storing a logical volume management program according to claim 1, wherein said storage area extension unit deletes information on said second stage logical volume made to correspond to said first logical volume before extending the storage area from said second storage device after making said new second stage logical volume correspond to said first stage logical volume.

3. A computer-readable storage medium storing a logical volume management program according to claim 1, wherein a storage area of said second stage logical volume is managed in units of segments, and each segment has a primary slice and a secondary slice the total storage capacity of which are the same as the storage capacity of the segment units respectively and separate storage areas of said storage device made to correspond to a primary slice and a secondary slice, and said access unit accesses a storage area of said storage device made to correspond to said primary slice.

4. A logical volume management apparatus executing processes to allocate a storage area to a logical volume, comprising:
    a first storage unit that stores configuration information on a first stage logical volume to which a correspondence relationship of storage areas between the first stage logical volume and at least one second stage logical volume is registered;
    a second storage unit that stores configuration information on said second stage logical volume to which a correspondence relationship of storage areas between said second stage logical volume and at least one storage device is registered;
    an access unit that refers to said configuration information on said first stage logical volume in response to an access request designating a storage area in said first stage logical volume, and determines a storage area in said second stage logical volume that corresponds to said first stage logical volume designated by the access request, refers to said configuration information on said second stage logical volume and accesses a storage area in said storage device that corresponds to the determined storage area in said second stage logical volume;
    a logical volume generation unit that generates, in response to a request to extend a storage area of said first stage logical volume, a new second stage logical volume to which the following are allocated; a storage area in said storage device is allocated to said second stage logical volume and a storage area in said storage device, the amount of which is equivalent to a difference between the storage capacity designated by said storage area extension request and the storage capacity of said first stage logical volume before extension, the logical volume generation unit then registering the correspondence relationship of storage areas between said new second stage logical volume and said storage device to said configuration information on said second stage logical volume, and
    a storage area extension unit that extends the storage area of said first stage logical volume stored in said configuration information on said first stage logical volume to the storage capacity designated by said storage area extension request, and makes said new second stage logical volume generated by said logical volume generation unit correspond to said first stage logical volume with extended storage area.

5. A logical volume management method in which a computer performs processes to allocate a storage area to a logical volume, wherein said computer;
    causes a first storage unit to store configuration information on a first stage logical volume to which a correspondence relationship of storage areas between a first stage logical volume and at least one second stage logical volume is registered;
    causes a second storage unit to store configuration information on a second stage logical volume to which a correspondence relationship of storage areas between said second stage logical volume and at least one storage device is registered;

refers to said configuration information on said first stage logical volume in response to an access request designating a storage area in said first stage logical volume, and determines a storage area in said second stage logical volume that corresponds to storage area in said first logical volume designated by the access request, refers to said configuration information on said second stage logical volume and accesses a storage area in said storage device that corresponds to the determined storage area in said second stage logical volume;

generates, in response to a request to extend the designated amount of a storage area of said first stage logical volume, a new second stage logical volume to which the following are allocated; a storage area in said storage device that is allocated to said second stage logical volume and a storage area in said storage device the amount of which is equivalent to a difference between the storage capacity designated by said storage area extension request and the storage capacity of said first stage logical volume before extension, the computer then registering the correspondence relationship of storage areas between said new second stage logical volume and said storage device to said configuration information on said second stage logical volume, and extending the storage area of said first stage logical volume stored in said configuration information on the first stage logical volume to the storage capacity designated by said storage area extension request, and making said new second stage logical volume correspond to said first stage logical volume with extended storage area.

6. A distributed storage system to allocate a storage area to a logical volume comprising;

at least one disk node connected to a network and a storage device;

an access node connected to said network and further comprising:

a first storage unit that stores configuration information on a first stage logical volume to which a correspondence relationship of storage areas between said first stage logical volume and at least one second stage logical volume is registered;

a second storage unit that stores configuration information on said second stage logical volume to which a correspondence relationship of storage areas between said second stage logical volume and at least said one storage device is registered;

an access unit that refers to said configuration information on said first stage logical volume in response to an access request designating a storage area in said first stage logical volume, and determines a storage area in said second stage logical volume that corresponds to a storage area in said first logical volume designated by the access request, refers to said configuration information on said second stage logical volume and accesses a storage area in said storage device that corresponds to the determined storage area in said second stage logical volume;

a logical volume generation unit that generates, in response to a request to extend designated amount of a storage area of said first stage logical volume, a new second stage logical volume to which the following are allocated;

a storage area in said storage device allocated to said second stage logical volume and a storage area in said storage device the amount of which is equivalent to a difference between the storage capacity designated by said storage area extension request and the storage capacity of said first stage logical volume before extension, and the storage device then registering the correspondence relationship of storage areas between said new second stage logical volume and said storage device to said configuration information on said second stage logical volume, and a storage area extension unit that extends the storage area of said first stage logical volume stored in said configuration information on the first stage logical volume to the storage capacity designated by said storage area extension request, and makes said new second stage logical volume generated by said logical volume generation unit correspond to said first stage logical volume with extended storage area; and a control node that manages storage areas allocated to and not allocated to said second stage logical volume among storage areas of said storage device, selects a storage area which is not allocated to said second stage logical volume among storage areas of said storage device when extending a storage area of said first stage logical volume, and designates the selected storage area of said storage device as a storage area to be allocated to the storage area that corresponds to the extended amount of said new second stage logical volume.

7. A distributed storage system according to claim 6, wherein said control node manages free space of said storage device, and designates a storage area in said storage device to be allocated to said new second logical volume of said access node when a storage capacity of said first stage logical volume is extended.

* * * * *